United States Patent
Nguyen et al.

(10) Patent No.: US 8,839,381 B2
(45) Date of Patent: Sep. 16, 2014

(54) REVOKING DELEGATABLE ANONYMOUS CREDENTIALS

(75) Inventors: Lan Nguyen, Bellevue, WA (US); Tolga Acar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 952 days.

(21) Appl. No.: 12/961,505

(22) Filed: Dec. 7, 2010

(65) Prior Publication Data
US 2012/0144459 A1 Jun. 7, 2012

(51) Int. Cl.
- *H04L 29/06* (2006.01)
- *H04L 9/32* (2006.01)
- *H04L 9/08* (2006.01)

(52) U.S. Cl.
CPC ............ *H04L 9/0891* (2013.01); *H04L 9/3218* (2013.01); *H04L 2209/38* (2013.01); *H04L 2209/42* (2013.01)
USPC .......................................................... 726/5

(58) Field of Classification Search
USPC .......................................................... 726/5
See application file for complete search history.

(56) References Cited

U.S. PATENT DOCUMENTS

| | | | |
|---|---|---|---|
| 7,213,262 B1 | 5/2007 | Elley et al. | |
| 7,360,080 B2 | 4/2008 | Camnisch et al. | |
| 7,543,139 B2 | 6/2009 | Camenisch et al. | |
| 7,747,857 B2 | 6/2010 | Ramzan et al. | |
| 7,783,777 B1 | 8/2010 | Pabla et al. | |
| 2007/0150944 A1 | 6/2007 | Zeng et al. | |
| 2009/0132813 A1 | 5/2009 | Schibuk | |
| 2009/0177591 A1 | 7/2009 | Thorpe et al. | |

OTHER PUBLICATIONS

Boyen, et al., "Compact Group Signatures Without Random Oracles", Retrieved at << http://eprint.iacr.org/2005/381.pdf >>, Mar. 7, 2006, pp. 1-19.

Ateniese, et al., "Proofs of Storage from Homomorphic Identification Protocols", Retrieved at << http://www.cs.jhu.edu/~ateniese/papers/pos.pdf >>, 15th International Conference on the Theory and Application of Cryptology and Information Security, Dec. 6-10, 2009, pp. 1-14.

Au, et al., "Dynamic Universal Accumulators for DDH Groups and their Application to Attribute-Based Anonymous Credential Systems", Retrieved at << http://uow.academia.edu/documents/0009/2568/full.pdf >>, Apr. 27, 2009, pp. 1-26.

Belenkiy, et al., "Randomizable Proofs and Delegatable Anonymous Credentials", Retrieved at << https://www.cosic.esat.kuleuven.be/publications/article-1239.pdf >>, 29th Annual International Cryptology Conference, Aug. 16-20, 2009, pp. 108-125.

(Continued)

*Primary Examiner* — Lisa Lewis
(74) *Attorney, Agent, or Firm* — Dan Choi; Sade Fashokun; Micky Minhas

(57) ABSTRACT

The claimed subject matter provides a method for revoking delegatable anonymous credentials. The method includes receiving a request to revoke an anonymous credential. The anonymous credential may be representative of an ability to prove non-membership in an accumulator for a first entity. The method also includes revoking the anonymous credential from the first entity in response to the request to revoke the anonymous credential. Additionally, the method includes revoking the anonymous credential from a second entity in response to the request to revoke the anonymous credential. The first entity delegates the anonymous credential to the second entity.

20 Claims, 4 Drawing Sheets

(56) References Cited

OTHER PUBLICATIONS

Belenkiy, et al., "P-Signatures and Noninteractive Anonymous Credentials", Retrieved at << http://www.iacr.org/archive/tcc2008/49480352/49480352.pdf >>, Fifth Theory of Cryptography Conference TCC, Mar. 19-21, 2008, pp. 36.

Bichsel, et al., "Anonymous Credentials on a Standard Java Card", Retrieved at << http://www.shoup.net/papers/bcgs.pdf >>, 16th ACM Conference on Computer and Communications Security, Nov. 9-13, 2009, pp. 11.

Boneh, et al., "Short Group Signatures", Retrieved at << http://crypto.stanford.edu/~dabo/papers/groupsigs.pdf >>, 24th Annual International CryptologyConference, Aug. 15-19, 2004, pp. 38.

Boyen, et al., "Full-Domain Subgroup Hiding and Constant-Size Group Signatures", Retrieved at << http://userweb.cs.utexas.edu/~bwaters/publications/papers/pkc07grp.pdf >>, 10th International Conference on Practice and Theory in Public-Key Cryptography, Apr. 16-20, 2007, pp. 46.

Brickell, et al., "Direct Anonymous Attestation", Retrieved at << http://eprint.iacr.org/2004/205.pdf >>, 11th ACM Conference on Computer and Communications Security, Oct. 25-29, 2004, pp. 56.

Camenisch, et al., "Signature Schemes and Anonymous Credentials from Bilinear Maps", Retrieved at << http://www.iacr.org/archive/crypto2004/31520055/cl04.pdf >>, 24th Annual International Cryptology Conference, Aug. 15-19, 2004, pp. 17.

Camenisch, et al., "Simulatable Adaptive Oblivious Transfer", Retrieved at << http://www.cs.virginia.edu/papers/CNS07.pdf >>, 26th Annual International Conference on the Theory and Applications of Cryptographic Techniques, May 20-24, 2007, pp. 50.

Camenisch, et al., "Design and Implementation of the Idemix Anonymous Credential System", Retrieved at << http://www.freehaven.net/anonbib/cache/idemix.pdf >>, Proceedings of the 9th ACM Conference on Computer and Communications Security, CCS, Nov. 18-22, 2002, pp. 20.

Charles, et al., "Signatures for Network Coding", Retrieved at << http://ieeexplore.ieee.org/stamp/stamp.jsp?tp=&arnumber=4067928 >>, International Journal of Information and Coding Theory, vol. 1, No. 1, Mar. 24, 2009, pp. 857-863.

Dodis, et al., "Cryptography Against Continuous Memory Attacks", Retrieved at << http://eprint.iacr.org/2010/196.pdf >>, Apr. 25, 2010, pp. 53.

Fouque, et al., "Sharing Decryption in the Context of Voting or Lotteries", Retrieved at << http://citeseerx.ist.psu.edu/viewdoc/download?doi=10.1.1.104.5575&rep=rep1&type=pdf >>, 4th International Conference, FC, Feb. 20-24, 2000, pp. 30.

Gentry, Craig., "Fully Homomorphic Encryption using Ideal Lattices", Retrieved at << http://domino.research.ibm.com/comm/research_projects.nsf/pages/security.homoenc.html/$FILE/stocdhe.pdf >>, Proceedings of the 41st Annual ACM Symposium on Theory of Computing, STOC, May 31-Jun. 2, 2009, pp. 10.

Ghadafi, et al., "Groth Sahai Proofs Revisited", Retrieved at << http://eprint.iacr.org/2009/599.pdf >>, 13th International Conference on Practice and Theory in Public Key Cryptography, May 26-28, 2010, pp. 16.

Groth, et al., "Efficient Non-Interactive Proof Systems for Bilinear Groups", Retrieved at << http://www.brics.dk/~jg/WlmoduleFull.pdf >>, Mar. 26, 2010, pp. 72.

Johnson, et al., "Homomorphic Signature Schemes", Retrieved at << http://www.cs.berkeley.edu/~dmolnar/papers/hom-rsa02.pdf >>, Topics in Cryptology—CT-RSA, The Cryptographer's Track at the RSA Conference, Feb. 18-22, 2002, pp. 18.

Johnson, et al., "Homomorphic Signatures for Digital Photographs", Retrieved at << http://www.leifwalsh.info/crop.pdf >>, pp. 1-19, 2012.

"Microsoft. U-prove community technology preview. In", Retrieved at << https://connect.microsoft.com/content/content.aspx?contentid=12505&siteid=642 >>, Retrieved Date: Sep. 8, 2010, pp. 55.

Monnerat, et al., "Generic Homomorphic Undeniable Signatures", Retrieved at << http://citeseerx.ist.psu.edu/viewdoc/download-?doi=10.1.1.163.9882&rep=rep1&type=pdf >>, 10th International Conference on the Theory and Application of Cryptology and Information Security, Dec. 5-9, 2004, pp. 34.

Tsang, et al., "PEREA: Towards Practical TTP-Free Revocation in Anonymous Authentication", Retrieved at << http://www.cs.dartmouth.edu/~patrick/pub/perea-ccs08.pdf >>, 15th ACM Conference on Computer and Communications Security, Oct. 27-31, 2008, pp. 333-343.

Yun, et al., "On Homomorphic Signatures for Network Coding", Retrieved at << http://www.math.snu.ac.kr/~jhcheon/publications/2009/HomoSig_ToC09.pdf >>, IEEE Transactions on Computers, vol. X, No. X, 2009, pp. 1-3.

REVOKING DELEGATABLE ANONYMOUS CREDENTIALS

BACKGROUND

In anonymous credential systems, a user with an anonymous credential may prove select private information while protecting other parts of the user's identity. For example, a person may choose to disclose only having a valid driver's license without disclosing name, age, address, etc. (or vice versa).

In some cases, anonymous credentials may be delegated. With delegatable credentials, a chain of delegation may describe a number of users delegating authority in a particular direction.

Some applications of anonymous credential systems include direct anonymous attestation and anonymous electronic identity tokens. Some of these approaches have been captured in implementations including U-prove, Idemix, and java cards.

Anonymous credential systems may include revocation functionality. With revocation, credentials may be invalided. Revocation is useful with regard to many organizational matters, including disputes, compromise, mistakes, identity change, hacking and other insecurities.

Revocation is challenging in anonymous credential systems because it is difficult to anonymously prove that a credential is not revoked. In the case of delegatable credentials, chains of delegation may be difficult to trail because of anonymity protections. As such, revocation may be especially challenging for anonymous credential systems with delegatable credentials.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for revoking delegatable anonymous credentials. The method includes receiving a request to revoke an anonymous credential. A valid anonymous credential may be representative of an ability to prove non-membership in an accumulator for a first entity. The anonymous credential is delegated from the first entity to a second entity. The method also includes revoking the anonymous credential from the first entity in response to the request to revoke the anonymous credential. Additionally, the method includes revoking the anonymous credential from a second entity in response to the request to revoke the anonymous credential.

An exemplary system according to the subject innovation may be used for delegatable anonymous credentials. The exemplary system comprises a processing unit and a system memory that comprises code configured to direct the processing unit to receive a request to revoke an anonymous credential representative of an ability to prove non-membership in a universal, dynamic accumulator for a first entity.

The code may also be configured to direct the processing unit to revoke the anonymous credential from the first entity in response to the request to revoke the anonymous credential. In particular, the code may be configured to direct the processing unit to revoke the anonymous credential from a second entity in response to the request to revoke the anonymous credential Another exemplary embodiment of the subject innovation provides one or more computer readable storage media that include code to direct the operation of a processing unit. In one exemplary embodiment, the code may direct the processing unit to receive a request to revoke an anonymous credential representative of an ability to prove non-membership in an accumulator for a first entity. The request is received from an anonymous credential system.

The code may also direct the processing unit to revoke the anonymous credential from the first entity in response to the request to revoke the anonymous credential. Additionally, the code may direct the processing unit to revoke the anonymous credential from a second entity in response to the request to revoke the anonymous credential.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
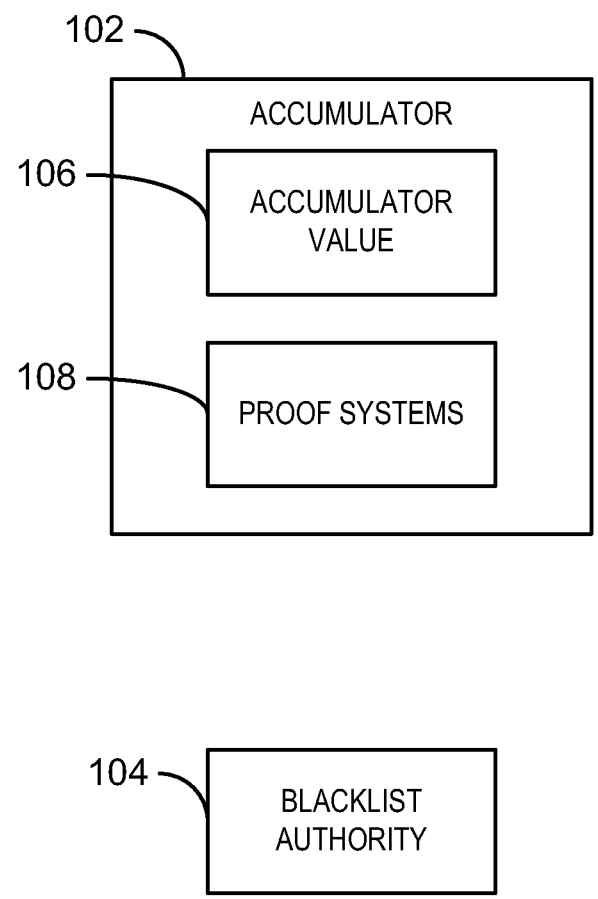
FIG. 1 is a block diagram of a system for revocation of anonymous credentials in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "browser," "search engine," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Proof systems are used in many cryptographic systems, such as signature, authentication, encryption, mix-net, and anonymous credential systems. In a proof system between a prover and a verifier, an honest prover with a witness can convince a verifier about the truth of a statement. However, an adversary cannot convince a verifier of a false statement.

One proof system, Groth and Sahai non-interactive proof system (GS proof system) provides several advantages. The GS proof systems are efficient and general, and do not use the random oracle assumption. The random oracle model assumes the existence of an oracle, returns a uniformly random response to queries, and outputs the same response for the same query. Additionally, GS proof systems can be randomized. For example, a new proof may be generated from an existing proof of the same statement without knowing the witness. Advantageously, as described below, GS proof systems are also homomorphic.

Proof systems are used to construct accumulators. An accumulator allows aggregation of a large set of elements into one constant-size accumulator value. A membership proof system may be used to prove that an element is in the accumulated value.

A non-membership proof system may be used to prove that an element is not accumulated. It can be used for revoking anonymous credentials.

For example, an accumulator may aggregate a large set of revoked credentials. The user whose credential has not been revoked may want to prove that the credential is not revoked by using the accumulator's non-membership proof system.

One embodiment provides an accumulator that is dynamic and universal. An accumulator may be dynamic if costs of certain operations do not depend on the number of elements aggregated. These operations may include adding elements, deleting elements, updating the accumulator value, and updating the proof systems' witnesses.

An accumulator is said to be universal if, in addition to the membership proof system, the accumulator includes a non-membership proof system. The non-membership proof system may prove that a given element is not accumulated in the accumulator value, e.g., the valid credential is not aggregated into the accumulator value.

Some applications of accumulators include space-efficient time stamping, ad-hoc anonymous authentication, ring signatures, ID-Based systems, and membership revocation for identity escrow, group signatures and anonymous credentials.

In one embodiment, homomorphic proofs may allow adding proofs and their statements to generate a new proof of the summed statement. A construction of such homomorphic proofs may be used in an accumulator scheme with delegatable non-membership (NM) proofs. This scheme may be used to extend a scheme with randomizable proofs and delegatable anonymous credentials. In this manner, an anonymous credential system with delegatable credentials may be created. This system may include revocation for the delegatable credentials.

As such, the accumulator's delegatable NM proofs may enable user A, without revealing user A's identity, to delegate to user B the ability to prove that A's credential has not been revoked. This ability may be supported even in scenarios where a blacklist of revoked credentials is dynamic.

Additionally, the delegation may be redelegatable, unlinkable, and verifiable. The security of the proposed schemes is provable.

FIG. 1 is a block diagram of a system 100 for revocation of anonymous credentials in accordance with the claimed subject matter. The system 100 may provide revocation for several anonymous credential systems, which may be delegatable or not.

An anonymous credential system is delegatable if credentials can be delegated from one user, the delegator, to another user, the delegatee. The delegatee may anonymously prove a credential which is delegated some levels away from the original delegator. Delegation is useful for efficiently managing many kinds of organizations. For example, many organizations include some authority who delegates tasks to a workforce so no one person is overburdened.

The system 100 may include an accumulator 102 and a blacklist authority 104. The accumulator 102 may implement the accumulator scheme with delegatable non-membership (NM) proofs.

The accumulator 102 may include an accumulator value 106 and proof systems 108. The blacklist authority 104 may use the accumulator 102 to create a blacklist and accumulate revoked identities of anonymous credentials. The accumulator value 106 is referred to herein as the blacklist because the accumulator 102 may aggregate the identities of revoked credentials in the accumulator value 106.

In the system 100, a user may prove that an identity is not accumulated in the blacklist. The user may also delegate this proof. Further, the delegatee may re-delegate or compute proofs based on the delegation.

The system 100 may be used with several anonymous credential systems with or without delegatability. In one embodiment, several anonymous credential systems, based on prime order, may be integrated with the system 100. In such embodiments, the anonymous credentials may or may not be delegatable.

The efficiencies of accumulators typically depend on the constant costs of their proofs. However, there is a tradeoff between the cost of computing and updating a witness. The cost of updating a witness is linear to the number of accumulated elements. As such, accumulators may be an inefficient choice in scenarios that involve numerous changes to the accumulator value, but only a few proofs. In some scenarios, the accumulator may be adjusted to improve performance. Some example improvement is described in greater detail with respect to Section 7.

1. Introduction

In one embodiment, homomorphic proofs may be extended to include an operation which adds proofs, their statements, and their witnesses. The adding operation may generate a new valid proof of the sum statement and the sum witness. In the following sections, a construction for homomorphic proofs from GS proofs is presented and proven. GS proofs have a high level of generalization, which enables their application in a number of areas, including group signatures, ring signatures, mix-nets, oblivious transfer, and anonymous credentials. In one embodiment, the construction of homomorphic proofs uses a general form of GS proofs to broaden the range of possible applications.

Some applications for homomorphic proofs may include homomorphic signatures, homomorphic authentication, network coding, digital photography, and undeniable signatures. Homomorphic encryption and commitment schemes have been used in mix-nets, voting, anonymous credentials, and other multi-party computation systems.

Additionally, homomorphic non-interactive zero knowledge (NIZK) is used for homomorphic encryption, which allows computing any generic functions of encrypted data without decryption. Homomorphic NIZK may be applied in scenarios such as cloud computing and searchable encryption. Homomorphic proofs may also be useful in these contexts.

Homomorphic proofs bring delegatability of proofs to another level. A proof's statement often consists of some commitments of variables (witnesses) and some conditions. A proof may be randomizable or malleable. As such, it is possible to generate a new proof and to randomize the statement's commitments without witness. However, the statement's conditions stay the same.

Homomorphic proofs allow generating a new proof for a new statement containing new conditions, without any witness. A user can delegate the user's proving capability to another user by revealing some homomorphic proofs. By linearly combining these proofs and their statements, the delegatee could generate several new proofs for several other statements with different conditions.

In one embodiment, homomorphic proofs may be used in blacklisting delegatable, anonymous credentials. Using delegatable NM proofs of accumulators, changing a blacklist may be treated like changing a statement's conditions. In one embodiment, delegating proofs is not restrained to retaining the same statements' conditions. Rather, proofs may be delegated where the statements' conditions are dynamic.

Typically, the blacklisting of anonymous credentials involves the use of the accumulator 102. Identities of revoked credentials are accumulated in a blacklist, e.g., the accumulator value 106. A user proves that the user's credential is not revoked by using the accumulator's NM proof, whose cost is constant, to prove that the credential's identity is not accumulated.

In one embodiment, when a delegatable credential is revoked, all delegated descendants of the credential may also be revoked. Accordingly, the system 100 may ask users to anonymously prove that all ancestor credentials are not revoked, even when the blacklist changes.

Using the accumulator 102, user A, without revealing private information, may delegate the ability to prove user A's credentials is not blacklisted to user B. As such, proofs generated by A and B may be indistinguishable, even though the blacklist is dynamic. Additionally, the delegation may be unlinkable, i.e., it should be hard to tell if two such delegations come from the same delegator.

Further, user B may also be able to delegate the ability to prove that A's credential is not blacklisted to user C, such that the information C obtains from the redelegation is indistinguishable from the information obtained from user A's delegation. When receiving delegation information, one may be able to verify that such information is correctly built.

The system 100 is described in greater detail in the following sections. Section 2 describes proof systems 108. Section 3 discusses homomorphic proofs. In section 4, the accumulator 102 is described in greater detail. A model is described for the accumulator 102, which is extended to define security requirements for delegatable NM proofs. Section 5 describes a scheme for the accumulator 102 with delegatable non-membership proofs.

In section 6, revoking delegatable anonymous credentials is described. Security of the accumulator scheme and the delegatable anonymous credentials with revocation system is proven.

Section 7 describes an example implementation. Section 8 is an appendix that provides proofs to theorems discussed in the following sections.

The following discussion uses, as examples, constructions in the symmetric external Diffie Hellman (SXDH) or symmetric decisional linear (SDLIN) instantiations of GS proofs, as these constructions enable the use of efficient curves for pairings.

2. Proof Systems

The following discussion includes a number of references and equations. As such, some abbreviations and notation are used for clarity. Further, a brief list of definitions is provided. These are briefly described as follows.

The abbreviations used include PPT, CRS, Pr, NM, and ADNMP. PPT stands for probabilistic polynomial time. CRS stands for common reference string. Pr stands for probability. NM stands for non-membership. ADNMP stands for the accumulator 102 with delegatable non-membership proofs.

The notation, "←" represents random output. The notation, $\mathbb{G}^* := \mathbb{G} \setminus \{O\}$, represents a group $\mathbb{G}$ with identity O. $\mathrm{Mat}_{m \times n}(\mathcal{R})$ is the set of matrices with size m×n of elements in $\mathcal{R}$. For a matrix Γ, Γ[i, j] represents the value at row i and column j. A vector $\vec{z}$ of l elements can be seen as a matrix of l rows and 1 column. For a vector or tuple z, the term, z[i], represents the $i^{th}$ element. Notations of algorithms may omit inputs, such as public parameters, when appropriate.

Definition: Bilinear Pairings. For example, let $\mathbb{G}_1$ and $\mathbb{G}_2$ be cyclic additive groups of order prime p generated by $P_1$ and $P_2$, respectively. Further, let $\mathbb{G}_T$ be a cyclic multiplicative group of order p. An efficiently computable bilinear pairing $e: \mathbb{G}_1 \times \mathbb{G}_2 \to \mathbb{G}_T$ satisfies: $e(\alpha P, bQ) = e(P, Q)^{ab}$, $\forall P \in \mathbb{G}_1, Q \in \mathbb{G}_2, \alpha, b \in \mathbb{Z}_p$; and $e(P_1, P_2)$ generates $\mathbb{G}_T$.

Definition: Symmetric eXternal Diffie Hellman (SXDH). For bilinear setup (p, $\mathbb{G}_1, \mathbb{G}_2, \mathbb{G}_T$, e, $P_1$, $P_2$) with prime p, eXternal Diffie-Hellman (XDH) assumes that the Decisional Diffie-Hellman (DDH) problem is computationally hard in one of $\mathbb{G}_1$ or $\mathbb{G}_2$. Symmetric XDH (SXDH) assumes that DDH is hard in both $\mathbb{G}_1$ and $\mathbb{G}_2$.

2.1 Non-Interactive Proof System

Let R be an efficiently computable relation of (Para, Sta, Wit) with setup parameters: Para, a statement, Sta, and a witness, Wit. A non-interactive proof system for R consists of 3 PPT algorithms: a Setup, a prover, Prove, and a verifier, Verify. A non-interactive proof system (Setup, Prove, Verify) is typically complete and sound.

Completeness means that for every PPT adversary $\mathcal{A}$, Pr[Para←Setup($1^k$); (Sta, Wit)←$\mathcal{A}$ (Para); Proof←Prove (Para, Sta, Wit): Verify(Para, Sta, Proof)=1 if (Para, Sta, W it) ∈ R] is overwhelming.

Soundness means that for every PPT adversary $\mathcal{A}$, Pr[Para←Setup($1^k$); (Sta, Proof)←$\mathcal{A}$ (Para): Verify(Para, Sta, Proof)=0 if (Para, Sta, Wit) ∉R, ∀Wit] is overwhelming.

Zero-knowledge. A non-interactive proof system is Zero-Knowledge (ZK), if the proof does not reveal any information except proving that the statement is true. Witness Indistinguishability (WI) may prevent the verifier from determining which witness was used in the proof. A non-interactive proof system is composable ZK if there exists a PPT simulation algorithm outputting a trapdoor and parameters indistinguishable from Setup's output. Further, the non-interactive proof system is composable ZK if, under the simulated parameters, ZK holds even when the adversary knows the trapdoor. Composable ZK implies the standard ZK.

Randomizing Proofs and Commitments. A randomizable non-interactive proof system has another PPT algorithm, RandProof, that takes as input (Para, Sta, Proof) and outputs another valid proof, Proof'. The Proof' may be indistinguishable from a proof produced by Prove.

A PPT commitment algorithm, Com, binds and hides a value, x, with a random opening, r. Informally, a commitment scheme is if there exists a PPT algorithm, ReCom, such that ReCom(Com(x, r), r')=Com(x, r+r'). Sta and Proof may contain commitments of variables.

A non-interactive proof system is malleable if it is efficient to randomize the proof and its statement's commitments to get a new proof which is valid for the new statement. When possible, concatenation of two proofs is a proof that merges setup parameters and all commitments and proves the combination of conditions. From a proof, Proof, a projected proof is obtained by moving some commitments from the statement to Proof.

Partial Extractability. A non-interactive proof of knowledge (NIPK) system (Setup, Prove, Verify) is F-extractable for a bijection, F, if there is a PPT extractor (ExSet, ExWit) such that ExSet's output Para is distributed identically to Setup's output, and if, for every PPT adversary, $\mathcal{A}$, Pr[(Para, td)←ExSet($1^k$); (Sta, Proof)←$\mathcal{A}$ (Para); Ext←ExWit(td, Sta, Proof): Verify(Para, Sta, Proof)=1 ∧ (Para, Sta, $F^{-1}$ (Ext)) ∉R] is negligible. Similar to approaches in P-signatures and non-interactive anonymous credentials, the notations, NIPK or NIZKPK (ZK for zero knowledge), are used for a statement consisting of commitments $C_1, \ldots, C_k$ of witness' variables $x_1, \ldots, x_k$ and some Condition: Proof←NIPK[$x_1$in$C_1, \ldots,$ $x_k$in$C_k$]{F(Para, Wit): Condition(Para, Wit)}.

2.2 Groth-Sahai (GS) Proofs

Bilinear Map Modules. Given a finite commutative ring (R, +,·,0,1), an abelian group (A, +,0) is an $\mathcal{R}$-module if ∀r, s ∈ $\mathcal{R}$, ∀x, y ∈ A: (r+s)x=rx+sx ∧ r(x+y)=rx+ry ∧ r(sx)=(rs)x ∧ 1x=x. Let $A_1, A_2, A_T$ be $\mathcal{R}$-modules with a bilinear map $f$: $A_1 \times A_2 \to A_T$. Let $B_1, B_2, B_T$ be R-modules with a bilinear map F: $B_1 \times B_2 \to B_T$ and efficiently computable maps $l_1: A_1 \to B_1$, $l_2: A_2 \to B_2$ and $l_T: A_T \to B_T$. Maps $p_1: B_1 \to A1$, $p2: B2 \to A_2$ and $p_T: B_T \to A_T$ may be challenging to compute and satisfy the commutative properties: $F(l_1(x), l_2(y))=l_T(f(x, y))$ and $f(p_1(x), p_2(y))=p_T(F(x, y))$. For $\vec{x} \in A_1^n$ and $\vec{y} \in A_2^n$, denote $\vec{x} \cdot \vec{y} = \Sigma_{i=1}^n f(x[i], y[i])$. For $\vec{c} \in B_1^n$ and $\vec{d} \in B_2^n$, denote $\vec{c} \bullet \vec{d} = \Sigma_{i=1}^n F(c[i], d[i])$.

Setup. GS parameters, Para, includes setup Gk and CRS σ·Gk:=($\mathcal{R}$, {$A_1^{(i)}, A_2^{(i)}, A_T^{(i)}, f^{(i)}$}$_{i=1}^L$) where $A_1^{(i)}, A_2^{(i)}$, $A_T^{(i)}$ are $\mathcal{R}$-modules with map $f^{(i)}: A_1^{(i)} \times A_2^{(i)} \to A_T^{(i)}$. L is the number of equations in a statement to be proved. σ:=({$B_1^{(i)}$, $B_2^{(i)}$, $B_T^{(i)}$, $F^{(i)}$, $1_1^{(i)}$, $p_1^{(i)}$, $1_2^{(i)}$, $p_2^{(i)}$, $1_T^{(i)}$, $p_T^{(i)}$, $\vec{u}_1^{(i)}$, $\vec{u}_2^{(i)}$, $H_1^{(i)}, \ldots, H_{\eta^i}^{(i)}$}$_{i=1}^L$) where $B_1^{(i)}, B_2^{(i)}, B_T^{(i)}, F^{(i)}, 1_1^{(i)}, p_1^{(i)}$, $1_2^{(i)}, p_2^{(i)}, 1_T^{(i)}, p_T^{(i)}$ are described above. $\vec{u}_1^{(i)}$ consists of $\hat{m}^{(i)}$ elements in $B_1^{(i)}$ and $\vec{u}_2^{(i)}$ consists of $\hat{n}^{(i)}$ elements in $B_2^{(i)}$. They are commitment keys for $A_1^{(i)}$ and $A_2^{(i)}$ respectively, as discussed below.

Matrices $H_1^{(i)}, \ldots, H_{\eta^i}^{(i)} \in \text{Mat}_{\hat{m}^{(i)} \times \hat{n}^{(i)}}(\mathcal{R})$ generate all matrices $H^{(i)}$ satisfying $\vec{u}_1^{(i)} \bullet H^{(i)} \vec{u}_2^{(i)} = 0$. In some scenarios, $A_k^{(i)} \equiv A_l^{(j)}$ for some k, l ∈ {1,2} and i,j ∈ {1, ..., L}. In such a scenario, the following limitation applies: $(B_k^{(i)}, 1_k^{(i)}, p_k^{(i)}, \vec{u}_k^{(i)}) \equiv (B_l^{(j)}, p_l^{(j)}, p_l^{(j)}, \vec{u}_l^{(j)})$.

Statement. A GS statement is a set of L equations. Each equation is over $\mathcal{R}$-modules $A_1, A_2, A_T$ with map $f$: $A_1 \times A_2 \to A_T$ as follows:

$\Sigma_{j=1}^n f(\alpha_j, y_j) + \Sigma_{i=1}^m f(x_i, b_i) + \Sigma_{i=1}^m \Sigma_{j=1}^n \gamma_{ij} f(x_i, y_j) = t$, where variables $x_1, \ldots, x_m \in A_1$ and $y_1, \ldots, y_n \in A_2$ and coefffficients $\alpha_1, \ldots, \alpha_m \in A_1, b_1, \ldots, b_n \in A_2$ and $t \in A_T$. For any matrix $\Gamma \in \text{Mat}_{m \times n}(\mathcal{R})$, there exists $\vec{x} \cdot \Gamma \vec{y} = \Gamma^T \vec{x} \cdot \vec{y}$ and $\vec{x} \bullet \Gamma \vec{y} = \Gamma^T \vec{x} \bullet \vec{y}$. As such, each equation may be written as $\vec{\alpha} \cdot \vec{y} + \vec{x} \cdot \vec{b} + \vec{x} \cdot \Gamma \vec{y} = t$.

A GS statement can be viewed as a set $\{(\vec{\alpha}_i, \vec{b}_i, \Gamma_i, t_i)\}_{i=1}^L$ over the corresponding set of bilinear groups $\{A_1^{(i)}, A_2^{(i)}, A_T^{(i)}\}$, $\{f^{(i)}\}_{i=1}^L$ satisfying equations $\vec{a}_i \cdot \vec{y}_i + \vec{x}_i \cdot \vec{b}_i + \vec{x}_i \cdot \Gamma \vec{y}_i = t_i$. The witness is the set of corresponding variables $\{\vec{x}_i, \vec{y}_i\}_{i=1}^L$.

Commitment. Given keys $\vec{u}_1 \in B_1^{\hat{m}}$ and $\vec{u}_2 \in B_2^{\hat{n}}$, commitments of $\vec{x} \in A_1^m$ and $\vec{y} \in A_2^n$ are respectively computed as $\vec{c} := l_1(\vec{x}) + R \vec{u}_1$ and $\vec{d} := l_2(\vec{y}) + S \vec{u}_2$, where R←$\text{Mat}_{m \times \hat{m}}(\mathcal{R})$ and S←$\text{Mat}_{n \times \hat{n}}(\mathcal{R})$. Further, $\vec{c} \in B_1^m$ and $\vec{d} \in B_2^n$. The commitment keys could be one of two types: hiding and binding. Hiding keys satisfy $l(A_1) \subseteq (\vec{u}_1)$ and $l(A_2) \subseteq (\vec{u}_2)$. As such, the commitments are perfectly hiding. Binding keys satisfy $p_1(\vec{u}_1) = \vec{0}$ and $p_2(\vec{u}_2) = \vec{0}$, and the maps $l_1 \circ p_1$ and $l_2 \circ p_2$ are non-trivial. If they are identity maps, then the commitments are perfectly binding.

Proof. For a statement consisting of several $(\vec{a}, \vec{b}, \Gamma, t)$ and a witness of corresponding variables $(\vec{x}, \vec{y})$, the proof includes commitments $(\vec{c}, \vec{d})$ of the variables and corresponding pairs $(\vec{\pi}, \vec{\psi})$, computed as follows. Generate R←$\text{Mat}_{m \times \hat{m}}(\mathcal{R})$, S←$\text{Mat}_{n \times \hat{n}}(\mathcal{R})$, T←$\text{Mat}_{\hat{n} \times \hat{m}}(\mathcal{R})$ and $r_1, \ldots, r_\eta$←$\mathcal{R}$. Compute $\vec{c} := l_1(\vec{x}) + R \vec{u}_1$; $\vec{d} := l_2(\vec{y}) + S \vec{u}_2$; $\vec{\pi} := R^T l_2(\vec{b}) + R^T T l_2(\vec{y}) + R^T T S \vec{u}_2 - T^T \vec{u}_2 + \Sigma_{i=1}^n r_i H_i \vec{u}_2$; and $\vec{\psi} := S^T l_1(\vec{\alpha}) + S^T \Gamma^T l_1(\vec{x}) + T \vec{u}_1$. Dimension of $\vec{b}$, $\vec{x}$ and $\vec{c}$ is m, dimension of $\vec{\alpha}$, $\vec{y}$ and $\vec{d}$ is n, dimension of $\vec{\pi}$ is $\hat{m}$, and dimension of $\vec{\psi}$ is $\hat{n}$. To show that a variable of one equation is the same as another variable of the same or another equation, the same commitment is used for the variables. Verification for each equation's proof may be accomplished by ensuring that $l_1(\vec{\alpha}) \bullet \vec{d} + \vec{c} \bullet l_2(\vec{b}) + \vec{c} \bullet \Gamma \vec{d} = l_T(t) + \vec{u}_1 \bullet \vec{\pi} + \vec{\psi} \bullet \vec{u}_2$.

SXDH Instantiation. Bilinear pairing modules $Z_p$, $\mathbb{G}_1$, $\mathbb{G}_2$ and $\mathbb{G}_T$ and map e are sufficient to specify all equations in a statement. Accordingly, Para includes setup Gk=(p, $\mathbb{G}_1, \mathbb{G}_2, \mathbb{G}_T$, e, $P_1$, $P_2$) and CRS $\sigma=(B_1, B_2, B_T, F, l_1, p_1, l_2, p_2, l_1, p_1, l_2, p_2, l_T, P_T, \vec{u}, \vec{v})$ where $B_1=\mathbb{G}_1^2$, $B_2=\mathbb{G}_2^2$ and $B_T:=\mathbb{G}_T^4$ with entry-wise group operations. $\mathbb{G}_1$, $\mathbb{G}_2$ and $\mathbb{G}_T$ could be viewed as $Z_p$-modules with map e. Matrices $H_1, \ldots, H_n$ are not needed. Vectors $\vec{u}$ of $u_1, u_2 \in B_1$ and $\vec{v}$ of $v_1, v_2 \in B_2$ are commitment keys for $\mathbb{G}_1$ and $\mathbb{G}_2$.

There are 4 types of equations in statements: pairing product, multi-scalar multiplication in $\mathbb{G}_1$, multi-scalar multiplication in $\mathbb{G}_2$, and quadratic equations. For pairing product, $A_1=\mathbb{G}_1$, $A_2=\mathbb{G}_2$, $A_T=\mathbb{G}_T$, $f(X,Y)=e(X,Y)$, and equations are $(\vec{A}\cdot\vec{Y})(\vec{X}\cdot\vec{B})(\vec{X}\cdot\Gamma\vec{Y})=t_T$. For multi-scalar multiplication in $\mathbb{G}_1$, $A_1=\mathbb{G}_1$, $A_2=Z_p$, $A_T=\mathbb{G}_1$, $f(X,y)=yX$, and equations are $\vec{A}\cdot\vec{y}+\vec{X}\cdot\vec{b}+\vec{X}\cdot\Gamma\vec{y}=T_1$. For multi-scalar multiplication in $\mathbb{G}_2$, $A_1=Z_p$, $A_2=\mathbb{G}_2$, $A_T=\mathbb{G}_2$, $f(x,Y)=xY$, and equations are $\vec{\alpha}\cdot\vec{Y}+\vec{x}\cdot\vec{B}+\vec{x}\cdot\Gamma\vec{y}=T_2$. For quadratic equations, $A_1=Z_p$, $A_2=Z_p$, $A_T=Z_p$, $f(x,y)=xy \bmod p$ and equations are $\vec{\alpha}\cdot\vec{y}+\vec{x}\cdot\vec{b}+\vec{x}\cdot\Gamma\vec{y}=t$.

A proof and its verification can then be done as specified in the general GS proofs. GS proofs are WI and, in some cases, ZK. In the SXDH and Decisional Linear (DLIN) instantiations, for statements consisting of only multi-scalar multiplication and quadratic equations, GS proofs are composable ZK.

3. Homomorphic Proofs 3.1 Formalization

As stated previously, an abelian group satisfies five conditions: Closure, Associativity, Commutativity, Identity Element, and Inverse Element.

Definition. Let (Setup, Prove, Verify) be a proof system for a relation R and Para$\leftarrow$Setup($1^k$). Consider a subset $\Pi$ of all (Sta, Wit, Proof) such that (Para, Sta, Wit) $\in$ R and Verify (Para, Sta, Proof)=1, and an operation $+_\Pi$: $\Pi\times\Pi\rightarrow\Pi$. $\Pi$ is said to be a set of homomorphic proofs if ($\Pi$, $+_\Pi$) satisfies Closure, Associativity and Commutativity. For an $I_\Pi:=$(Sta$_0$, Wit$_0$, Proof$_0$) $\in \Pi$, $\Pi$ is said to be a set of strongly homomorphic proofs if ($\Pi$, $+_\Pi$, $I_\Pi$) forms an abelian group where $I_\Pi$ is the identity element.

If $+_\Pi$((Sta$_1$, Wit$_1$, Proof$_1$), (Sta$_2$, Wit$_2$, Proof$_2$))$\mapsto$ (Sta, Wit, Proof), the following notations apply: (Sta, Wit, Proof)$\leftarrow$(Sta$_1$, Wit$_1$, Proof$_1$)$+_\Pi$(Sta$_2$, Wit$_2$, Proof$_2$), Sta$\leftarrow$Sta$_1+_\Pi$Sta$_2$, Wit$\leftarrow$Wit$_1+_\Pi$Wit$_2$, and Proof$\leftarrow$Proof$_1+_\Pi$Proof$_2$. Further, the multiplicative notation n(Sta, Wit, Proof) may be used for the addition of n times of (Sta, Wit, Proof). As such, the notation, $\Sigma_i \alpha_i$(Sta$_i$, Wit$_i$, Proof$_i$), may be used to represent linear combination of statements, witnesses and proofs. These homomorphic properties are particularly useful for randomizable proofs. One can randomize a proof computed from the homomorphic operation to get another proof which is indistinguishable from a proof generated by Prove.

3.2 GS Homomorphic Proofs

Consider a GS proof system (Setup, Prove, Verify) of L equations. Each map $l_1: A_1 \rightarrow B_1$ satisfies $l_1(x_1+x_2)=l_1(x_1)+l_1(x_2)$, $\forall x_1, x_2 \in A_1$, and similarly for $l_2$.

The identity may be defined $I_{GS}=$(Sta$_0$, Wit$_0$, Proof$_0$). Sta$_0$ consists of L GS equations ($\vec{\alpha}_0$, $\vec{b}_0$, $\Gamma_0$, $t_0$), Wit$_0$ consists of L corresponding GS variables ($\vec{x}_0$, $\vec{y}_0$), Proof$_0$ consists of L corresponding GS proofs ($\vec{c}_0$, $\vec{d}_0$, $\vec{\pi}_0$, $\vec{\psi}_0$), and there are L tuples of corresponding maps ($l_1$, $l_2$). They satisfy:

Let m be the dimension of $\vec{b}_0$, $\vec{x}_0$ and $\vec{c}_0$. There exists a set $M \subseteq \{1, \ldots, m\}$ such that $\forall i \in M$, $b_0[i]=0$; $\forall j \in \overline{M}$, $x_0[j]=0$ and $c_0[j]=l_1(0)$, where $\overline{M}:=\{1, \ldots, m\}\setminus M$.

Let n be the dimension of $\vec{\alpha}_0$, $\vec{y}_0$ and $\vec{d}_0$. There exists a set $N \subseteq \{1, \ldots, n\}$ such that $\forall i \in N$, $\alpha_0[i]=0$; $\forall j \in \overline{N}$, $y_0[j]=0$ and $d_0[j]=l_2(0)$, where $\overline{N}:=\{1, \ldots, n\}\setminus N$.

Both ($\forall i \in \overline{M}$, $\forall j \in \overline{N}$) and ($\forall i \in M$, $\forall j \in N$): $\Gamma_0[i,j]=0$.

$t_0=0$, $\vec{\pi}_0=0$, and $\vec{\psi}_0=0$.

A set $\Pi_{GS}$ of tuples (Sta, Wit, Proof) may be defined from the identity $I_{GS}$. Sta consists of L GS equations ($\vec{\alpha}$, $\vec{b}$, $\Gamma$, t) (corresponding to Sta$_0$'s ($\vec{\alpha}_0$, $\vec{b}_0$, $\Gamma_0$, $t_0$) with m, n, M, N); Wit consists of L corresponding GS variables ($\vec{x}$, $\vec{y}$); Proof consists of L corresponding GS proofs ($\vec{c}$, $\vec{d}$, $\vec{\pi}$, $\vec{\psi}$); satisfying:

$\forall i \in M$, $x[i]=x_0[i]$ and $c[i]=c_0[i]$. $\forall j \in \overline{M}$, $b[j]=b_0[j]$.

$\forall i \in N$, $y[i]=y_0[i]$ and $d[i]=d_0[i]$. $\forall j \in \overline{N}$, $\alpha[j]=\alpha_0[j]$.

If ($i \in \overline{M}$) V ($j \in \overline{N}$), then $\Gamma[i,j]=\Gamma_0[i,j]$. That means $\forall i \in M$, $\forall j \in N$: $\Gamma[i,j]=0$.

Operation may be defined as $+_{GS}$: $\Pi_{GS}\times\Pi_{GS}\rightarrow\Pi_{GS}$. For i $\in \{1,2\}$ and (Sta$_i$, Wit$_i$, Proof$_i$) $\in \Pi_{GS}$, Sta$_i$ consists of L GS equations ($\vec{\alpha}_i$, $\vec{b}_i$, $\Gamma_i$, $t_i$) corresponding to Sta$_0$'s ($\vec{\alpha}_0$, $\vec{b}_0$, $\Gamma_0$, $t_0$). Wit$_i$ consists of L corresponding GS variables ($\vec{x}_i$, $\vec{y}_i$), and Proof$_i$ consists of L corresponding GS proofs ($\vec{c}_i$, $\vec{d}_i$, $\vec{\pi}_i$, $\vec{\psi}_i$).

Compute (Sta, Wit, Proof)$\leftarrow$(Sta$_1$, Wit$_1$, Proof$_1$)$+_{GS}$(Sta$_2$, Wit$_2$, Proof$_2$) of corresponding ($\vec{\alpha}$, $\vec{b}$, $\Gamma$, t), ($\vec{x}$, $\vec{y}$) and ($\vec{c}$, $\vec{d}$, $\vec{\pi}$, $\vec{\psi}$) as follows.

$\forall i \in M$: $x[i]:=x_1[i]$; $c[i]:=c_1[i]$; $b[i]:=b_1[i]+b_2[i]$. $\forall j \in \overline{M}$: $b[j]:=b_1[j]$; $x[j]:=x_1[j]+x_2[j]$; $c[j]:=c_1[j]+c_2[j]$.

$\forall i \in N$: $y[i]:=y_1[i]$; $d[i]:=d_1[i]$; $\alpha[i]:=\alpha_1[i]+\alpha_2[i]$. $\forall j \in \overline{N}$: $\alpha[j]:=\alpha_1[j]$; $y[j]:=y_1[j]+y_2[j]$; $d[j]:=d_1[j]+d_2[j]$.

If ($i \in \overline{M}$) V ($j \in \overline{N}$), then $\Gamma[i,j]:=\Gamma_1[i,j]$. Otherwise, $\Gamma[i,j]:=\Gamma_1[i,j]+\Gamma_2[i,j]$.

$t=t_1+t_2$, $\vec{\pi}=\vec{\pi}_1+\vec{\pi}_2$, and $\vec{\psi}_1+\vec{\psi}_2$.

Theorem 3.1 In the definitions above, $\Pi_{GS}$ is a set of strongly homomorphic proofs with operation $+_{GS}$ and the identity element $I_{GS}$. A proof of theorem 3.1 is described in greater detail with respect to section 8.

4. Accumulator 4.1 Model

A universal accumulator consists of the following PPT algorithms.

Setup takes in $1^l$ and outputs (Para, Aux), where Para is setup parameters containing a domain Dom$_{Para}$ of elements to be accumulated and Aux is some auxiliary information.

Accu takes in Para and a set of elements AcSet and returns an accumulator value AcVal. In some cases, Accu may also take in Aux to compute AcVal more efficiently. The input as a set, where order makes no difference, instead of a sequence implies a quasi commutativity property.

A proof system (Setup, ProveMem, VerifyMem) proves that an element Ele is accumulated in AcVal. Note that AcSet is not an input. There is a PPT algorithm, CompMemWit, to compute a membership witness for this proof from Para, Ele, AcSet and AcVal.

A non-membership proof system (Setup, ProveNM, VerifyNM) proves that an element Ele is not accumulated in AcVal. Note that AcSet is not an input. There is a PPT algorithm CompNMWit to compute an NM witness for this proof from Para, Ele, AcSet and AcVal.

An accumulator is dynamic if there exist the following 3 PPT algorithms, whose costs should not depend on AcSet's size, for adding or removing an accumulated element Ele.

UpdateVal, whose input includes Para, Ele, the current accumulator value AcVal and Aux, updates the accumulator value. UpdateMemWit, whose input includes Para, Ele, the current witness Wit and AcVal, updates membership witnesses. For universal accumulators, UpdateNMWit, whose input includes Para, Ele, the current witness Wit and AcVal, updates NM witnesses.

Security of accumulators is implied by completeness and soundness of the 2 proof systems. Membership proofs are not described herein. As such, a universal accumulator is referred to herein as (Setup, ProveNM, VerifyNM, CompNMWit, Accu).

4.2 Delegatable NM Proofs for Accumulators

Delegating ability to prove statements is to allow someone else to prove the statements on one's behalf without revealing the witness, even if the statements' conditions are changing over time. For privacy reasons, adversaries could not distinguish different delegations coming from different users. Moreover, the delegatee could verify a delegation and unlinkably redelegate the proving ability further to other users.

Therefore, delegating an accumulator's non-membership proofs should meet 4 conditions: delegatability, unlinkability, redelegatability, and verifiability. Delegatability means that an element Ele's owner may delegate her ability to prove that Ele is not accumulated without simply revealing Ele. Even if the set of accumulated elements changes overtime, the delegatee does not contact the delegator again to generate the proof. Instead, the owner of the proof gives the delegatee a key De generated from Ele. The proof generated from De by CompProof is indistinguishable from a proof generated by ProveNM.

Unlinkability means that a delegatee should not be able to distinguish whether or not 2 delegating keys originating from the same element. Unlinkability implies that it is computationally hard to compute an element from the element's delegating keys.

Redelegatability means that the delegatee may redelegate De as De' to other users, so that the distributions of De and De' are indistinguishable. Verifiability means that one should be able to validate that a delegating key De is correctly built.

Definition: A universal accumulator (Setup, ProveNM, VerifyNM, CompNMWit, Accu) provides delegatable non-membership proofs if there exist PPT algorithms: delegating Dele, redelegating Rede, validating Vali, and computing proof CompProof. These algorithms may satisfy:

Delegatability: For every PPT algorithm ($\mathcal{A}_1$, $\mathcal{A}_2$), |Pr[(Para, Aux)←Setup($1^k$); (Ele, AcSet, state)←$\mathcal{A}_1$ (Para); AcVal←Accu(Para, AcSet); Wit←CompNMWit(Para, Ele, AcSet, AcVal); Proof$_0$←ProveNM(Para, AcVal, Wit); De←Dele(Para, Ele); Proof$_1$←CompProof(Para, De, AcSet, AcVal); b←{0,1}; b'←$\mathcal{A}_2$(state, AcVal, Wit, De, Proof$_b$): (Ele ∉ AcSet) ∧ b=b']−½| is negligible.

Unlinkability: For every PPT algorithm $\mathcal{A}$, |Pr[(Para, Aux)←Setup($1^k$); (Ele$_0$,Ele$_1$)←Dom$_{Para}$; De←Dele (Para, Ele$_0$); b←{0,1}; De$_b$←Dele(Para, Ele$_b$); b'←$\mathcal{A}$ (Para, De, De$_b$): b=b']−½| is negligible.

Redelegatability: For every PPT algorithms ($\mathcal{A}_1$, $\mathcal{A}_2$), |Pr [(Para, Aux)←Setup($1^k$); (Ele, state)←$\mathcal{A}_1$(Para); De←Dele(Para, Ele); De$_0$←Dele(Para, Ele); De$_1$←Rede (Para, De); b←{0,1}; b'←$\mathcal{A}_2$(state, De, De$_b$):b=b']−½| is negligible.

Verifiability: For every PPT algorithm $\mathcal{A}$, |Pr[(Para, Aux)←Setup($1^k$); Ele←$\mathcal{A}$ (Para); De←Dele(Para, Ele): Vali(Para, De)=1 if Ele ∈ Dom$_{Para}$]−1| and |Pr[(Para, Aux)←Setup ($1^k$); De'←$\mathcal{A}$ (Para): Vali(Para, De')=0 if De' ∉ {De|De←Dele(Para, Ele'); Ele' ∈ Dom$_{Para}$}]−1| are negligible.

However, given an element Ele', the delegatee can accumulate Ele' and try to prove that Ele is not accumulated using De. If the delegatee cannot prove that, then Ele≡Ele'. So for any ADNMP, given an element Ele and a delegating key De, one can tell if De is generated by Ele. Due to this restriction, in the accumulator's applications, Ele should be a secret that only its owner or a trusted authority knows.

5. An ADNMP Scheme

In one embodiment, a dynamic universal ADNMP may have its Setup, Accu and UpdateVal generalized from dynamic universal accumulators for Strong Diffie Hellman (SDH) groups.

Setup: GS instantiations may be used where GS proofs for this accumulator are composable ZK. As the corresponding GS proofs may be limited to multi-scalar or quadratic equations, either the SXDH or SDLIN instantiations may be used, as explained in section 2. For clarity, the following discussion merely uses SXDH as an example.

Parameters (p, $\mathbb{G}_1, \mathbb{G}_2, \mathbb{G}_T$, e, $P_1$, $P_2$) and CRS σ may be generated with perfectly binding keys for the SXDH instantiation of GS proofs as described in section 2. Auxiliary information Aux=δ←$\mathbb{Z}_p^*$ may also be generated. For the proof, generate A←$\mathbb{G}_1$ and τ:=$1_2$, (δ).

For efficient accumulating without Aux, a tuple ζ=($P_1$, δ$P_1$, ..., δ$^{q+1}$ $P_1$) is needed, where q ∈ $\mathbb{Z}_p^*$. The domain for elements to be accumulated is $\mathbb{D}$ =$\mathbb{Z}_p^*$ \ {−δ}. Accordingly, the parameters may be described as Para=(p, $\mathbb{G}_1, \mathbb{G}_2, \mathbb{G}_T$, e, $P_1$, $P_2$, A, σ, ζ, τ).

Accu: On input AcSet={$\alpha_1$, ..., $\alpha_Q$} ⊂ $\mathbb{D}$, compute m=Q/q. If Aux=δ is available, the output AcVal is a set of m component accumulator values $\{V_j\}_{j=1}^{m}$ computed as $V_j = \Pi_{i=(j-1)q+1; \; i<Q} (\delta+\alpha_i)\delta P_1$. If Aux is not available, AcVal is efficiently computable from ζ and AcSet.

UpdateVal: In case α' ∈ $\mathbb{D}$ is being accumulated; from 1 to m, find the first $V_j$ which hasn't accumulated q elements and update $V_j=(\delta+\alpha')V_j$; if such $V_j$ could not be found, add $V_{m+1}=(\delta+\alpha')\delta P_1$. In case α' is removed from AcVal, find $V_j$ which contains α' and update $V_j=1/(\delta+\alpha')V_j$.

Remarks. Typically, q of ζ is the upper bound on the number of elements to be accumulated in accumulators, i.e., m=1. In one embodiment, the upper bound may be relaxed by the above generalization which allows this ADNMP to work whether or not q is less than the number of accumulated elements. It also allows q to be set up smaller.

5.1 NM Proof

It may be proven that an element $y_2 \in \mathbb{D}$ is not in any component accumulator value $V_j$ of AcVal $\{V_j\}_{j=1}^{m}$. Suppose $V_j$ accumulates {$\alpha_1$, ..., $\alpha_k$} where k≤q, denote Poly(δ):= $\Pi_{i=1}^{k}(\delta+\alpha_i)\delta$, then $V_j$=Poly(δ)$P_1$. Let $y_{j3}$ be the remainder of polynomial division Poly(δ) mod (δ+$y_2$) in $Z_p$, and $X_{j1}$ be scalar product of the quotient and $P_1$. Similar to universal, dynamic accumulators for DDH groups, constructing non-membership proofs may be based on the fact that $y_2$ is not a member of {$\alpha_1$, ..., $\alpha_k$} if and only if $y_{j3} \neq 0$. The following equation incorporates δ, $y_2$, $y_{j3}$ and $X_{j1}$: (δ+$y_2$)$X_{j1}$+$y_{j3}P_1$=$V_j$. Proving this equation by itself does not guarantee that $y_{j3}$ is the remainder of the polynomial division above. Also proven are the knowledge of ($y_{j3}P_2$, $y_{j3}A$) and the following Extended Strong DH (ESDH) assumption. The following assumption is a variation of the Hidden Strong DH (HSDH) assumption. However, it is not clear which assumption is stronger. It is in the extended uber-assumption family and can be proved in generic groups, similar to HSDH.

Definition. q-ESDH: Let (p, $\mathbb{G}_1, \mathbb{G}_2, \mathbb{G}_T$, e, $P_1$, $P_2$) be bilinear parameters, A←$\mathbb{G}_1^*$ and δ←$\mathbb{Z}_p^*$. Given $P_1$, δ$P_1$, ..., δ$^{q+1}P_1$, A, $P_2$, δ$P_2$, it is computationally hard to output $$\left(\frac{y_3}{\delta+y_2}P_1, y_2, y_3P_2, y_3A\right)$$

where $y_3 \neq 0$.

If one could prove the knowledge of $(y_{j3}P_2, y_{j3}A)$ satisfying $(\delta+y_2)X_{j1}+y_{j3}P_1=V$ and $y_2$ is accumulated in V but $y_{j3} \neq 0$, then the assumption may be broken. To prove the knowledge of $(y_{j3}P_2, y_{j3}A)$, then equation $X_{j3}-y_{j3}A=0$. To verify $y_{j3} \neq 0$, equation $T_j=y_{j3}X_{j2}$ and the verifier checks $T_j \neq 0$. Following is a description of the non-membership proof and its security.

CompNMWit takes in $y_2$, and for each component accumulator value $V_j$ of AcVal $\{V_j\}_{j=1}^m$, computes remainder $y_{j3}$ of Poly($\delta$) mod $(\delta+y_2)$ in $Z_p$ which is efficiently computable from $\{\alpha_1, \ldots, \alpha_k\}$ and $y_2$. It then computes $X_{j1}=(\text{Poly}(\delta)-y_{j3})/(\delta+y_2)P_1$, which is efficiently computable from $\{\alpha_1, \ldots, \alpha_k\}$, $y_2$ and $\zeta$. The witness includes $y_2$ and $\{(X_{j1}, X_{j3}=y_{j3}A, y_{j3})\}_{j=1}^m$. UpdateNMWit is for one $V_j$ at a time and similar to universal, dynamic accumulators for DDH groups. However, UpdateNMWit includes the extra task of updating $X_{j3}=y_{j3}A$.

ProveNM generates $X_{j2} \leftarrow \mathbb{G}_1^*$ and outputs $T_j=y_{j3}X_{j2}$ for each $V_j$ and a GS proof for the following equations of variables: $y_1=\delta$, $y_2$, $\{(X_{j1}, X_{j3}, X_{j2}, y_{j3})\}_{j=1}^m$ and $\wedge_{j=1}^m ((y_1+y_2)X_{j1}+y_{j3}P_1=V_j \wedge X_{j3}-y_{j3}A=0 \wedge y_{j3}X_{j2}=T_j)$.

Note that the prover does not need to know $y_1$. From $\tau$, it is efficient to generate a commitment of $\delta$ and the proof.

VerifyNM verifies the proof generated by ProveNM and checks that $T_j \neq 0$, $\forall j$. VerifyNM accepts if both of them pass, otherwise they are rejected.

Theorem 5.1 The proof system proves that an element is not accumulated. Its soundness depends on the ESDH assumption. Its composable ZK depends on the assumption underlying the GS instantiation (SXDH or SDLIN). A proof sketch of theorem 5.1 is described in section 8.

5.2 NM Proofs are Strongly Homomorphic

For the same constant A, the same variables $\delta$, $y_2$ and $X_{j2}$ and the same commitments, the set of non-membership proofs has the form of strongly homomorphic GS proofs constructed in section 3. Accordingly, delegatable non-membership proofs may be constructed from homomorphic proofs. Specifically, the delegatable non-membership proofs may be constructed by 'adding' 2 homomorphic proofs of 2 sets of equations (with the same commitments for $\delta$, $y_2$ and $X_{j2}$).

More specifically, $\wedge_{j=1}^m ((\delta+y_2)X_{j1}^{(1)}+y_{j3}^{(1)}P_1=V_j^{(1)} \wedge X_{j3}^{(1)}-y_{j3}^{(1)}A=0 \wedge y_{j3}^{(1)}X_{j2}=T_j^{(1)})$ and $\wedge_{j=1}^m ((\delta+y_2)X_{j1}^{(2)}+y_{j3}^{(2)}P_1=V_j^{(2)} \wedge X_{j3}^{(2)}-y_{j3}^{(2)}A=0 \wedge y_{j3}^{(2)}X_{j2}=T_j^{(2)})$ may form a proof of equations $\wedge_{j=1}^m ((\delta+y_2)X_{j1}+y_{j3}P_1=V_j \wedge X_{j3}-y_{j3}A=0 \wedge y_{j3}X_{j2}=T_j)$, where $X_{j1}=X_{j1}^{(1)}+X_{j1}^{(2)}$, $X_{j3}=X_{j3}^{(1)}+X_{j3}^{(2)}$, $y_{j3}=y_{j3}^{(1)}+y_{j3}^{(2)}$, $V_j=V_j^{(1)}+V_j^{(2)}$ and $T_j=T_j^{(1)}+T_j^{(2)}$.

5.3 Delegating NM Proof

Following is a description of constructing the accumulator's delegatable non-membership proof. A component accumulator value $V=\Pi_{i=1}^k (\delta+\alpha_i)\delta P_1$ of $\{\alpha_1, \ldots, \alpha_k\}$ can be written as $V=\Sigma_{i=0}^k b_i\delta^{k+1-i}P_1$ where $b_0=1$ and $b_i=\Sigma_{1 \leq j_1 < j_2 < \ldots < j_i \leq k} \Pi_{l=1}^i \alpha_{j_l}$. Accordingly, V can be written as a linear combination of $\delta P_1, \ldots, \delta^{k+1}P_1$ in $\zeta$.

Homomorphic proofs can be constructed for each $(\delta+y_2)X_1^{(i)}+y_3^{(i)}P_1=\delta^i P_1 \wedge X_3^{(i)}-y_3^{(i)}A=0 \wedge y_3^{(i)}X_2=T^{(i)}$ where $i \in \{1, \ldots, k+1\}$. Using the same linear combination of $\delta P_1, \ldots, \delta^{k+1}P_1$ for V, these proofs can linearly combined to get a proof for $(\delta+y_2)X_1+y_3P_1=V \wedge X_3-y_3A=0 \wedge y_3X_2=T$, where $X_1=\Sigma_{i=0}^k b_iX_1^{(k+1-i)}$, $X_3=\Sigma_{i=0}^k b_iX_3^{(k+1-i)}$, $y_3=\Sigma_{i=0}^k b_iy_3^{(k+1-i)}$ and $T=\Sigma_{i=0}^k b_iT^{(k+1-i)}$.

Following is a description of the algorithms for delegating non-membership proofs and the security theorem. It should be noted that UpdateProof may be used in place of CompProof when possible for efficiency.

Dele(Para, Ele). For each $i \in \{1, \ldots, q+1\}$, compute remainder $y_3^{(i)}$ of $\delta^i$ mod $(\delta+y_2)$ in $Z_p$, and $X_1^{(i)}=(\delta^i-y_3^{(i)})/(\delta+y_2)P_1$, which are efficiently computable from $y_2$ and $\zeta$. In fact, $y_3^{(i)}=(-1)^i y_2^i$ and $X_1^{(i+1)}=\Sigma_{j=0}^i (-1)^j y_2^j \delta^{i-j}P_1=\delta^i P_1-y_2X_1^{(i)}$ (so the cost of computing all $X_1^{(i)}$, $i \in \{1, \ldots, q+1\}$ is about q scalar products). Generate $X_2 \leftarrow \mathbb{G}_1^*$, the delegation key De includes $\{T^{(i)}=y_3^{(i)}X_2\}_{i=1}^{q+1}$ and a GS proof of equations $\wedge_{i=1}^{q+1} ((\delta+y_2)X_1^{(i)}+y_3^{(i)}P_1=\delta^i P_1 \wedge X_3^{(i)}-y_3^{(i)}A=0 \wedge y_3^{(i)}X_2=T^{(i)})$.

Rede(Para, De). For each $i \in \{1, \ldots, q+1\}$, extract proof Proof$_i$ of $y_3^{(i)}X_2=T^{(i)}$ in De. In each Proof$_i$, for the same $y_3^{(i)}$ and its commitment, Proof$_i$ is of homomorphic form. As such, generate $r \leftarrow Z_p^*$ and compute Proof$_i'$=rProof$_i$ which is a proof of $y_3^{(i)}X_2'=T'^{(i)}$, where $X_2'=rX_2$ and $T'^{(i)}=rT^{(i)}$. It should be noted that commitments of $y_3^{(i)}$ stay the same. For every $i \in \{1, \ldots, q+1\}$, replace $T^{(i)}$ by $T'^{(i)}$ and Proof$_i$ by Proof$_i'$ in De to get a new GS proof, which is then randomized to get the output De'.

Vali(Para, De). A simple option is to verify the GS proof De. An alternative way is to use batch verification: Divide De into proofs NMProof$_i$ of $(\delta+y_2)X_1^{(i)}+y_3^{(i)}P_1=\delta^i P_1 \wedge X_3^{(i)}-y_3^{(i)}A=0 \wedge y_3^{(i)}X_2=T^{(i)}$ for $i \in \{1, \ldots, q+1\}$. Generate q+1 random numbers to linearly combine NMProof$_i$s and their statements and verify the combined proof and statement.

CompProof(Para, De, AcSet, AcVal). Divide De into proofs NMProof$_i$ as in Vali.

For each component accumulator value V of $\{\alpha_1, \ldots, \alpha_k\}$, compute $b_i$ for $i \in \{0, \ldots, k\}$ as above. NMProof$_i$s belong to a set of homomorphic proofs, so compute NMProof=$\Sigma_{i=0}^k b_i$NMProof$_{k+1-i}$, which is a proof of $(\delta+y_2)X_1+y_3P_1=V \wedge X_3-y_3A=0 \wedge y_3X_2=T$ where $X_1$, $X_3$, $y_3$, T and V are as explained above.

Extract proof SubProof of $y_3X_2=T$ in NMProof. For the same $y_3$ and its commitment, SubProof is of homomorphic form. Accordingly, generate $r \leftarrow Z_p^*$ and compute SubProof'=rSubProof which is a proof of $y_3X_2'=T'$, where $X_2'=rX_2$ and $T'=rT$. Note that $y_3$'s commitment stays the same. Replace T by T' and SubProof by SubProof' in NMProof to get a new proof NMProof'.

Concatenate those NMProof' of all V in AcVal and output a randomization of the concatenation.

UpdateProof(Para, De, AcSet, AcVal, Proof, Opens). Proof is the proof to be updated and Opens contains openings for randomizing commitments of $y_1=\delta$ and $y_2$ from De to Proof. If there is a change in accumulated elements of a component value V, NMProof' may be computed for the updated V as in CompProof. Randomize NMProof' so that its commitments of $y_1$ and $y_2$ are the same as those in Proof and put it in Proof in place of its old part. Output a randomization of the result.

To prove that this construction provides an ADNMP, the following Decisional Strong Diffie Hellman (DSDH) assumption may be used. This assumption is not in the uber-assumption family, but can be proved in generic groups similarly to the PowerDDH assumption. A proof sketch of theorem 5.2 is described in section 8.

Definition. q-DSDH: Let $(p, \mathbb{G}_1, \mathbb{G}_2, \mathbb{G}_T, e, P_1, P_2)$ be bilinear parameters, $B_0, B_1 \leftarrow \mathbb{G}_1^*$, $x_0, x_1 \leftarrow \mathbb{Z}_p^*$ and $b \leftarrow \{0,1\}$. Given $B_0, x_0, B_0, \ldots, x_0^q B_0, B_1, x_bB_1, \ldots, x_b^q B_1$, no PPT algorithm could output b'=b with a probability non-negligibly better than a random guess.

Theorem 5.2 The accumulator provides delegatable non-membership proofs, based on ESDH, DSDH and the assumption underlying the GS instantiation (SXDH or SDLIN).

6. Revoking Delegatable Anonymous Credentials

6.1 Model

This is a model of delegatable anonymous credential with revocation systems. For each credential proof, a user uses a new nym which is indistinguishable from the user's other nyms. Another type of nyms may be used for revocation, referred to herein as r-nyms to distinguish between the 2 types. When an r-nym is revoked, its owner can no longer prove credentials. Participants include users and the blacklist authority 104 owning a blacklist, BL, which is initially empty. The PPT algorithms are:

Setup($1^k$) outputs trusted public parameters $Para_{DC}$, BA's secret key $Sk_{BA}$, and an initially empty blacklist BL.

KeyGen($Para_{DC}$) outputs a secret key Sk and a secret r-nym Rn for a user.

NymGen($Para_{DC}$, Sk, Rn) outputs a new nym Nym with an auxiliary key Aux(Nym).

An user O becomes a root credential issuer by publishing a nym $Nym_O$ and a proof that her r-nym $Rn_O$ is not revoked that O has to update when BL changes.

Issue($Para_{DC}$, $Nym_O$, $Sk_I$, $Rn_I$, $Nym_I$, Aux($Nym_I$), Cred, DeInf, $Nym_U$, L)↔Obtain($Para_{DC}$, $Nym_O$, $Sk_U$, $Rn_U$, $Nym_U$, Aux($Nym_U$), $Nym_I$, L) lets user I issue a level L+1 credential to user U. $Sk_I$, $Rn_I$, $Nym_I$ and Cred are the secret key, r-nym, nym and level L credential rooted at $Nym_o$ of issuer I. $Sk_U$, $Rn_U$ and $Nym_U$ are the secret key, r-nym and nym of user U. I gets no output and U gets a credential $Cred_U$. DeInf is optional. When it is included, U also gets delegation information $DeInf_U$ to later prove that r-nyms of all delegators in her chain are not revoked. If L=0 then Cred is omitted and DeInf=1 (optional).

Revoke($Para_{DC}$, $Sk_{BA}$, Rn, BL) updates BL so that a revoked user Rn cannot prove credentials or delegate.

CredProve($Para_{DC}$, $Nym_O$, Cred, DeInf, Sk, Rn, Nym, Aux(Nym), BL, L) takes a level L credential Cred, Sk, Rn and optionally DeInf to output CredProof, which proves that: (i) a credential level L is issued to Nym's owner. (ii) Nym's Rn is not revoked. (iii)(optional, when DeInf is included) all r-nyms on the credential's chain are not revoked.

CredVerify($Para_{DC}$, $Nym_O$, CredProof, Nym, BL, L) verifies if CredProof is a valid proof of the above statements.

The differences between the model for delegatable anonymous credentials with revocation and the model for delegatable anonymous credentials without revocation are the introductions of the blacklist authority 104 with $Sk_{BA}$ and BL; r-nyms; delegation information DeInf; Revoke; and 2 CredProof's conditions (ii) and (iii).

Generally speaking, delegability does not implicate anonymity. Nor is the reverse true, such as in this case. Suppose user I delegates to user U the ability to prove that I is not revoked in BL (U knows I by $Nym_I$). Then, in any construction, given an r-nym Rn, U and the blacklist authority 104 can collude to tell if Rn belongs to $Nym_I$ or not by blacklisting Rn and checking if U can still prove that I is not revoked. As such, it may be useful for a user to keeps the r-nym secret. Otherwise, the user may not know that such delegation could compromise the user's anonymity when issuing. It is still the user's right to delegate (or not) that proving ability (by issuing DeInf or not).

Advantageously, even in worst cases, a collision of the blacklist authority 104 and the delegatee may only learn if an r-nym belongs to a delegator from Issue↔Obtain. Other privacy properties such as anonymity of CredProof, Nym and the delegatee, may still be maintained.

This limitation will be reflected in the Anonymity definition and is related to the restriction on ADNMP mentioned in section 4.2. When a BL is implemented by using ADNMP to accumulate revoked Rns, given an Rn' and an ADNMP delegating key De, a user can collude with the blacklist authority 104 to tell if De is generated by Rn'.

Exposing r-nyms. Typical methods for the blacklist authority 104 may be used to obtain r-nyms to revoke. There could be an authority that may force any user to reveal the user's r-nym to BA, and prove the user's ownership by using CredProve and showing openings of his r-nym's commitment.

For example, users may give deposits to the authority when entering the system. If a user does not follow the enforcement, the deposit may be forfeited. If such an enforcement is difficult, another method adopted from group signatures is an Opening Authority who can open any disputed CredProof to find its generator's r-nym. Another option includes a Nym Authority that controls users' r-nyms and makes requests to the blacklist authority 104 to revoke r-nyms.

6.2 Security

According to an embodiment, the security includes three conditions which are extended from the security definition of delegatable anonymous credentials: correctness, anonymity, and unforgeability.

Correctness: Suppose all participants are honest. A user gets valid credentials from issuers. If the user is not revoked, the user may generate a credential proof that is typically accepted by a verifier, whether or not the user's credential chain is partially revoked. If the user's whole credential chain is partially revoked, the user may generate a credential proof, which is usually accepted.

Anonymity means that an adversary, who could collude with some participants in the system, can not gain any information about honest participants. The adversary's interaction with honest parties is indistinguishable from interaction with simulators, including SimSetup, SimProve, SimObtain and SimIssue. Additions to the security definition for delegatable anonymous credentials include Nym and DeInf. Nym reveals no information about its r-nym. New entities' r-nyms, blacklist and delegation information could be generated as part of challenges by the adversary to simulators. For scenarios when DeInf is included, when interacting with SimIssue, r-nyms on the chain of issuer's credentials are randomly generated and not revealed to the adversary. As discussed above, a user and the blacklist authority 104 can tell if a given r-nym belongs to one of the delegators on the user's chain.

Unforgeability: It means that an adversary, who could interact with the system in many ways, could not forge a valid credential proof for a challenge Nym of an r-nym and a secret key, which are in one of rogue conditions. Unforgeability also assumes complete binding of Nyms, so that one r-nym and one key could be extracted from a Nym. The adversary's interaction with the system is modelled by an Oracle that may perform several tasks based on the adversary's request.

The additions to the unforgeability definition for delegatable anonymous credentials include the following. The Oracle maintains a list of honest parties, which may or may not include BA. Apart from the condition that there is no chain of honest users who delegate the challenge Nym, another rogue condition is that the challenge r-nym is blacklisted by an honest BA. If a credential proof is used to prove that all users on its chain are not revoked, another rogue condition is that a user on the challenge Nym's credential chain is blacklisted by an honest BA.

6.3 A Scheme

Overview. Intuitions of the BCCKLS delegatable anonymous credential scheme are described, along with how ADNMP extends this scheme to provide revocation.

BCCKLS uses an F-Unforgeable certification secure authentication scheme AU of PPT algorithms AtSetup, AuthKg, Authen, VerifyAuth. AtSetup($1^k$) returns public parameters $Para_{At}$, AuthKg($Para_{At}$) generates a key Sk, Authen($Para_{At}$, Sk, $\vec{m}$) produces an authenticator Auth authenticating a vector of messages $\vec{m}$, and VerifyAuth ($Para_{At}$, Sk, $\vec{m}$, Auth) accepts if and only if Auth validly authenticates $\vec{m}$ under Sk. The scheme could be F-Unforgeable for a function F, which means (F($\vec{m}$), Auth) is unforgeable without obtaining an authenticator on $\vec{m}$; or certification secure, which means no PPT adversary, even after obtaining an authenticator by the challenge secret key, can forge another authenticator. Additionally, BCCKLS uses a protocol (AuthPro) for a user to obtain from an issuer an NIZKPK of an authenticator on $\vec{m}$ without revealing anything about $\vec{m}$.

An user U could generate a secret key Sk←AuthKg ($Para_{At}$), and many nyms Nym=Com(Sk, Open) by choosing different values Open. Supposing U has a level L+1 credential from O, let ($Sk_O$=$Sk_O$, $Sk_1$, . . . , $Sk_L$, $Sk_{L+1}$=Sk) be the keys such that $Sk_i$'s owner delegated the credential to $Sk_{i+1}$, and let H: $\{0,1\}^* \to Z_p$ be a collision resistant hash function. $r_i$=H ($Nym_O$, atributes, i) is computed for a set of attributes for that level's credential. U generates a proof of her delegated credential as CredProof←NIZKPK[$Sk_O$inNym$_O$,Sk in Nym] $\{(F(Sk_O), F(Sk_1), \ldots, F(Sk_L), F(Sk), auth_1, \ldots, auth_{L+1})$:
VerifyAuth($Sk_O$, ($Sk_1$,$r_1$), $auth_1$) ∧ VerifyAuth($Sk_1$, ($Sk_2$, $r_2$),$auth_2$) ∧ . . . ∧ VerifyAuth($Sk_{L-1}$, ($Sk_L$, $r_L$), $auth_L$) ∧ VerifyAuth($Sk_L$, (Sk, $r_{L+1}$),$auth_{L+1}$)$\}$.

ADNMP may extend BCCKLS to provide revocation. Using ADNMP, BA's blacklist, BL, includes an accumulated set of revoked Rns and its accumulator value. Beside a secret key Sk, user U has a secret r-nym Rn in the accumulator's domain, and generates nyms Nym=(Com(Sk, Open$_{Sk}$), Com (Rn, Open$_{Rn}$)). ADNMP allows delegation and redelegation of a proof that an Rn is not accumulated in a blacklist Rn ∉BL. U generates a proof of the delegated credential and validity of the credential's chain as:

CredProof←NIZKPK[$Sk_O$inNym$_O$ [1],SkinNym[1],Rnin-Nym[2]] $\{(F(Sk_O), F(Sk_1), F(Rn_1), \ldots, F(Sk_L), F(Rn_L),$ F(Sk), F(Rn), $auth_1, \ldots, auth_L, auth_{L+1})$: VerifyAuth($Sk_O$, ($Sk_1$,$Rn_1$,$r_1$),$auth_1$) ∧ ($Rn_1$ ∉BL) ∧ VerifyAuth($Sk_1$, ($Sk_2$,$Rn_2$,$r_2$),$auth_2$) ∧ ($Rn_2$ ∉BL) ∧ . . . ∧ VerifyAuth ($Sk_{L-1}$, ($Sk_L$,$Rn_L$,$r_L$),$auth_L$) ∧ ($Rn_L$ ∉BL) ∧ VerifyAuth ($Sk_L$,(Sk,Rn,$r_{L+1}$),$auth_{L+1}$) ∧ (Rn ∉BL)$\}$.

EQUATION 1

Description. The building blocks consist of: (i) Those from BCCKLS, including AU; AuthPro; H; and a malleable NIPK credential proof system (CredPS) of PKSetup, PKProve, PKVerify, RandProof, with commitment Corn; (ii) An accumulator with a randomizable delegatable non-membership proof system (NMPS) of AcSetup, ProveNM, VerifyNM, CompNMWit, Accu, Dele, Rede, Vali, CompProof, with commitment ComNM; and (iii) A randomizable proof system (EQPS), whose setup consists of PKSetup and AcSetup, to prove that 2 given commitments by Corn and ComNM commit to the same value.

Assume a delegating key De contains a commitment of its element Ele. CompProof and Rede generate Ele's commitment in their outputs by randomizing the commitment in De. Elements of the accumulator domain and the authenticator's keyspace can be committed by Corn.

The BCCKLS building blocks could be instantiated as in delegatable anonymous credentials. An ADNMP instantiation is presented in section 4. Additionally, an equality proof system(EQPS) instantiation with composable ZK can be constructed from p-signatures and noninteractive anonymous credentials. They all share the same bilinear pairing parameters, so elements of the accumulator domain and the authenticator's keyspace are in $\mathbb{Z}_p$ and committable by Com. The concatenation of instantiated CredPS, NMPS and EQPS forms a GS proof system and thereby is randomizable, partially extractable, and composable ZK. The following algorithm inputs are the same as in the model and omitted.

Setup: Use PKSetup($1^k$), AtSetup($1^k$) and AcSetup($1^k$) to generate $Para_{PK}$, $Para_{At}$, and ($Para_{Ac}$, $Aux_{Ac}$). The blacklist includes an accumulated set of revoked r-nyms and its accumulator value. Output an initial blacklist BL with an empty set and its initial accumulator value, $Para_{DC}$= ($Para_{PK}$, $Para_{At}$, $Para_{Ac}$, H), and $Sk_{BA}$=$Aux_{Ac}$.

KeyGen: Run AuthKg($Para_{At}$) to output a secret key Sk. Output a random r-nym Rn from the accumulator's domain.

NymGen: Generate random Open$_{Sk}$ and Open$_{Rn}$, and output nym Nym=(Com(Sk, Open$_{Sk}$), Com(Rn, Open$_{Rn}$)) and Aux(Nym)=(Open$_{Sk}$, Open$_{Rn}$).

The credential originator O publishes a Nym$_O$ and a proof NMProof$_O$ that Rn$_O$ is not revoked that O has to update when BL changes.

Issue↔Obtain: If L=0 and Nym$_O$≠Nym$_I$, aborts. Issuer I verifies that Nym$_I$ and Cred are valid with Sk$_I$, Rn$_I$ and Aux(Nym$_I$), and user U verifies that Nym is valid with Sk$_U$, Rn$_U$ and Aux(Nym$_U$). After that, they both compute $r_{L+1}$=H(Nym$_O$,atributes, L+1) for a set of attributes for that level's credential, as in delegatable anonymous credentials. They then run AuthPro for U to receive: Proof$_U$←NIZKPK[Sk$_I$in Nym$_I$[1], Sk$_U$inCom(Sk$_U$, 0), Rn$_U$inCom(Rn$_U$, 0)] $\{(F(Sk_I), F(Sk_U), F(Rn_U),auth)$:VerifyAuth(Sk$_I$, (Sk$_U$, Rn$_U$, $r_{L+1}$), auth)$\}$. U's output is Cred$_U$=Proof$_U$ when L=0. Otherwise, suppose the users on I's chain from the root are 0 (same as O), 1, 2, . . . , L (same as I). I randomizes Cred to get a proof CredProof$_I$ (containing the same Nym$_I$) that for every Nym$_j$ on I's chain for j ∈ $\{1, \ldots, L\}$, Sk$_j$ and Rn$_j$ are authenticated by Sk$_{j-1}$ (with $r_j$). Concatenate Proof$_U$ and CredProof$_I$ and project Nym$_I$ from statement to proof to get Cred$_U$.

The optional DeInf includes a list of delegating keys De$_j$s generated by the accumulator's Dele to prove that each Rn$_j$ is not accumulated in the blacklist, and a list of EQProof$_j$ for proving that two commitments of Rn$_j$ in Cred and De$_j$ commit to the same value Rn$_j$, for j ∈ $\{1, \ldots, L-1\}$. When DeInf is in the input, I Redes these delegating keys, updates and randomizes EQProof$_j$ to match the new keys and Cred$_U$, and adds a new delegating key De$_I$ to prove that Rn$_I$ is not revoked and a proof EQProof$_I$ that two commitments of Rn$_I$ in Nym$_I$[2] and De$_I$ commit to the same value. The result DeInf$_U$ is sent to U.

Revoke: Add Rn to the accumulated set and update the accumulator value.

CredProve: Abort if Nym≠ (Com(Sk, Open$_{Sk}$), Com(Rn, Open$_{Rn}$)). Use ProveNM to generate a proof, NMProof, that Rn is not blacklisted. Generate EQProof that Rn's commitments in NMProof and in Nym[2] both commit to the same value. Randomize Cred to get a proof which contains Nym. Concatenate this proof with NMProof and EQProof to get CredProof'. If the optional DeInf is omitted, just output CredProof'. Otherwise, use CompProof to generate a proof NMChainProof that each Rn$_j$'s on the user's chain of delegators is not accumulated in the blacklist Update and randomize EQProof$_j$ for j ∈ $\{1, \ldots, L\}$ to match with NMChainProof and CredProof'. Concatenate NMChainProof and CredProof' to output CredProof as described in EQUATION 1.

CredVerify runs PKVerify, VerifyNM and verifies EQProofs to output accept or reject.

Theorem 6.1 If the authentication scheme is F-unforgeable and certification-secure; a concatenation of CredPS, NMPS and EQPS is randomizable, partially extractable, and composable ZK; and H is collision resistant, then this construction is a secure revocable delegatable anonymous credential system. A proof sketch of theorem 6 is described in section 8.

6.4 A Method

Figure 2:
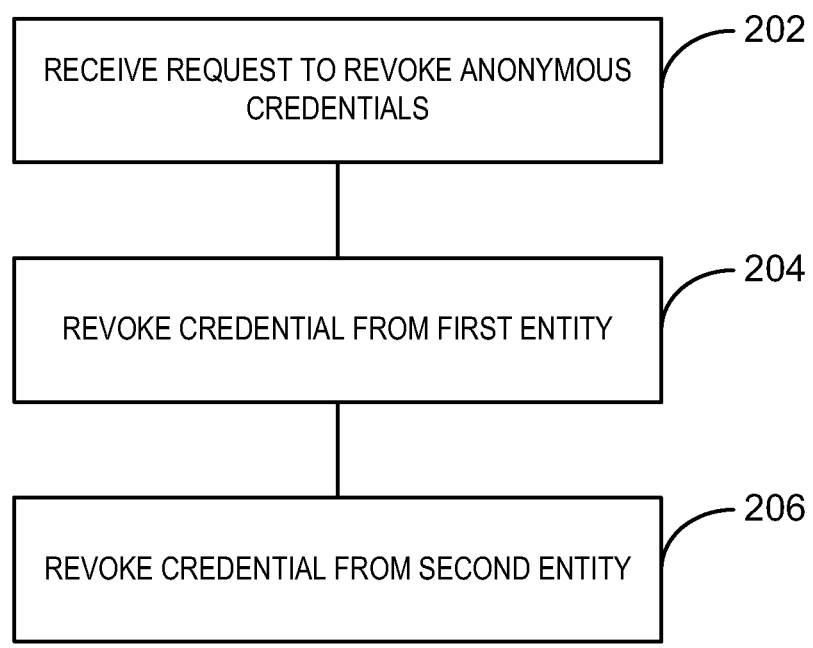
FIG. 2 is a process flow diagram of a method for revoking delegatable anonymous credentials in accordance with the claimed subject matter.

FIG. 2 is a process flow diagram of a method 200 for revoking delegatable anonymous credentials in accordance with the claimed subject matter. The method 200 may be performed by the blacklist authority 104.

The method begins at block 202, where a request is received to revoke an anonymous credential. The anonymous credential may be delegated from a first entity to a second entity.

At block 204, the blacklist authority 104 may revoke the anonymous credential from the first entity. The revocation may occur in response to the request to revoke.

At block 206, the blacklist authority 104 may revoke the anonymous credential from the second entity. The revocation for the second entity may also occur in response to the request to revoke.

7. Example Implementation

The system 100 may be implemented in two program libraries of various languages. The first library may implement the scheme for the accumulator 102 in the SXDH instantiation described in section 5. The first library may also be used to develop the accumulator's applications. Further, application program interfaces may be provided for the algorithms described herein, e.g., AcSetup, ProveNM, VerifyNM, CompNMWit, Accu, Dele, Rede, Vali and CompProof.

The second library may depend on the first library to perform the revoking of anonymous credentials described above.

Typically, prime-order universal accumulators use a random oracle (RO) for non-interactive proofs. The random oracle's its prover uses 3 pairings. In contrast, the accumulator 102 does not use a random oracle. Further, the accumulator's prover does no pairing. In one embodiment, with q=500, using 256-bit BN pairing curves, on a regular 2.4 GHz Intel 2 Core with 4 GB RAM, ProveNM takes 0.14 s and Dele takes 69.38 s.

In some embodiments, the system 100 may include a central entity that knows Aux, and can adjust the value of q at any time. Based on the work loads on the accumulator's operations and the number of accumulated elements, the value of q may be determined based on a desired efficiency improvement.

This improvement may be used in the following scenario. Assume in an application, the number of accumulated elements is around a constant Q over time, allowing for elements to be added or removed. Let m=[Q/q], the computation unit be a scalar product, and the approximate costs of the accumulator's operations be as follows (generalized for both SXDH and SDLIN instantiations): Accu-m; UpdateVal-1; CompNMWit-(mq≈Q); UpdateWitness-2; ProveNM-$\alpha_1$m; VerifyNM-$\alpha_2$m; Dele-$\beta_1$q; Rede-$\beta_2$q; Vali-$\beta_3$q; CompProof-($\beta_4$mq+$\alpha_3$m); UpdateProof-($\beta_4$+$\alpha_3$m); where $\alpha_i$ and $\beta_i$ are constants. For simplicity and analysis of a common user, less commonly used operations, operations performed by a central entity, and operations whose cost does not change when q changes are not described.

Suppose over a period of approximately a year, the average numbers of runs of operations per user are as follows: ProveNM-$a_1$; VerifyNM-$a_2$; Dele-$b_1$; Rede-$b_2$; Vali-$b_3$; CompProof-$a_3$; UpdateProof-c; where $a_i$, $b_i$ and c are constants. The total cost per user per period is $$S(q) \approx a_1\alpha_1 m + a_2\alpha_2 m + b_1\beta_1 q + b_2\beta_2 q + b_3\beta_3 q + a_3\alpha_3 m + a_3\beta_4 mq + c\beta_4 q + c\alpha_3 m \approx$$

$$\frac{(a_1\alpha_1 + a_2\alpha_2 + a_3\alpha_3 + c\alpha_3)Q}{q} + (b_1\beta_1 + b_2\beta_2 + b_3\beta_3 + c\beta_4)q + a_3\beta_4 Q.$$

Because $\left(\sqrt{(a_1\alpha_1 + a_2\alpha_2 + a_3\alpha_3 + c\alpha_3)Q/q} - \sqrt{(b_1\beta_1 + b_2\beta_2 + b_3\beta_3 + c\beta_4)q}\right)^2 \geq 0$, then, $\frac{(a_1\alpha_1 + a_2\alpha_2 + a_3\alpha_3 + c\alpha_3)Q}{q} + (b_1\beta_1 + b_2\beta_2 + b_3\beta_3 + c\beta_4)q \geq$ $2\sqrt{(a_1\alpha_1 + a_2\alpha_2 + a_3\alpha_3 + c\alpha_3)(b_1\beta_1 + b_2\beta_2 + b_3\beta_3 + c\beta_4)Q}$.

As such, a minimum of S(q) happens when $$q \approx \min\left(Q, \sqrt{\frac{a_1\alpha_1 + a_2\alpha_2 + a_3\alpha_3 + c\alpha_3}{b_1\beta_1 + b_2\beta_2 + b_3\beta_3 + c\beta_4}Q}\right).$$

Accordingly, if users have to generate proofs a great deal more than delegations, then q=Q. If their cost amounts are about the same, then q≈√Q.

8. Appendix: Proofs

Proof of theorem 3.1. To prove that ($\Pi_{GS}$, $+_{GS}$, $I_{GS}$) satisfies the 5 conditions of an abelian group, it is given that the following conditions: associativity, commutativity, identity element, and inverse element may be easily validated. As such, the proof of closure is described.

It is given that (Sta, Wit, Proof)←(Sta$_1$, Wit$_1$, Proof$_1$)+$_{GS}$ (Sta$_2$, Wit$_2$, Proof$_2$) (as in the description) satisfies the conditions for an element in $\Pi_{GS}$ as follows. $\forall i \in M$: $x[i]=x_1[i]=x_0[i]$ and $c[i]=c_1[i]=c_0[i]$. $\forall j \in \overline{M}$: $b[j]=b_1[j]=b_0[j]$. $\forall i \in N$: $y[i]=y_1[i]=y_0[i]$ and $d[i]=d_1[i]=d_0[i]$. $\forall j \in \overline{N}$: $\alpha[j]=\alpha_1[j]=\alpha_0[j]$. If $(i \in \overline{M}) \vee (j \in \overline{N})$, then $\Gamma[i,j]=\Gamma_1[i,j]=\Gamma_0[i,j]$. Then, to prove that Proof is the valid proof of Sta and Wit, suppose for $i \in \{1,2\}$, $\vec{c}_i:=l_1(\vec{x}_i)+R_i\vec{u}_1$, $\vec{d}_i:=l_2(\vec{y}_i)+S_i\vec{u}_2$, then $$\vec{\pi}_i:=R_i^T l_2(\vec{b}_i)+R_i^T \Gamma_i l_2(\vec{y}_i)+R_i^T \Gamma_i S_i \vec{u}_2 - T_i^T$$
$$\vec{u}_2 + \Sigma_{j=1}^n r_j^{(i)} H_j \vec{u}_2, \text{ and} \qquad\qquad \text{EQUATION 2}$$

$$\vec{\psi}_i:=S_i^T l_1(\vec{\alpha}_i)+S_i^T l_1(\vec{x}_i)+T_i \vec{u}_1 \qquad\qquad \text{EQUATION 3}$$

Without losing generality, for i∈{1,2}, it is true that $$\vec{x}_i := \begin{pmatrix} \hat{X} \\ \tilde{X}_i \end{pmatrix}, \vec{b}_i := \begin{pmatrix} \hat{B}_i \\ \tilde{B} \end{pmatrix}, R_i := \begin{pmatrix} \hat{R} \\ \tilde{R}_i \end{pmatrix}, \vec{c}_i := \begin{pmatrix} \hat{C} \\ \tilde{C}_i \end{pmatrix}$$

where $\hat{X}$ consists of x[j] with j ∈ M and $\tilde{X}_i$ consists of $x_i$[j] with j ∈ $\overline{M}$; $\hat{B}_i$ consists of $b_i$[j] with j ∈ M and $\tilde{B}$ consists of b[j] with j ∈ $\overline{M}$; and $\hat{R}$ consists of rows j of $R_i$ with j ∈ M and $\tilde{R}_i$ consists of rows j of $R_i$ with j ∈ $\overline{M}$; and $\hat{C}$ consists of c[j] with j ∈ M and $\tilde{C}_i$ consists of $C_i$[j] with j ∈ $\overline{M}$. As such, it is true that:

$$\vec{x} = \begin{pmatrix} \hat{X} \\ \tilde{X}_1 + \tilde{X}_2 \end{pmatrix}, \vec{b} = \begin{pmatrix} \hat{B}_1 + \hat{B}_2 \\ \tilde{B} \end{pmatrix}, R = \begin{pmatrix} \hat{R} \\ \tilde{R}_1 + \tilde{R}_2 \end{pmatrix} \qquad \text{EQUATION 4}$$

$$\vec{c} = \begin{pmatrix} \hat{C} \\ \tilde{C}_1 + \tilde{C}_2 \end{pmatrix}$$

$$= \begin{pmatrix} \iota_1(\hat{X}) + \hat{R}\vec{u}_1 \\ \iota_1(\tilde{X}_1) + \tilde{R}_1\vec{u}_1 + \iota_1(\tilde{X}_2) + \tilde{R}_2\vec{u}_1 \end{pmatrix}$$

$$= \begin{pmatrix} \iota_1(\hat{X}) + \hat{R}\vec{u}_1 \\ \iota_1(\tilde{X}_1 + \tilde{X}_2) + (\tilde{R}_1 + \tilde{R}_2)\vec{u}_1 \end{pmatrix}$$

$$= \iota_1(\vec{x}) + R\vec{u}_1$$

which is how commitment $\vec{c}$ may be generated from $\vec{x}$ and R for the proof. In the same way, without losing generality, for $i \in \{1,2\}$, it is true that $$\vec{y}_i := \begin{pmatrix} \hat{Y} \\ \tilde{Y}_i \end{pmatrix}, \vec{a}_i := \begin{pmatrix} \hat{A}_i \\ \tilde{A} \end{pmatrix}, S_i := \begin{pmatrix} \hat{S} \\ \tilde{S}_i \end{pmatrix}, \vec{d}_i := \begin{pmatrix} \hat{D} \\ \tilde{D}_i \end{pmatrix}$$

where $\hat{Y}$ consists of y[j] with $j \in N$ and $\tilde{Y}_i$ consists of $y_i$[j] with $j \in \overline{N}$; $\hat{A}_i$ consists of $\alpha_i$[j] with $j \in N$ and $\tilde{A}$ consists of $\alpha$[j] with $j \in \overline{N}$; $\hat{S}$ consists of rows j of $S_i$ with $j \in N$ and $\tilde{S}_i$ consists of rows j of $S_i$ with $j \in \overline{N}$; and $\hat{D}$ consists of d[j] with $j \in N$ and $D_i$ consists of $D_i$[j] with $j \in \overline{N}$. Further, $$\vec{y} = \begin{pmatrix} \hat{Y} \\ \tilde{Y}_1 + \tilde{Y}_2 \end{pmatrix}, \vec{a} = \begin{pmatrix} \hat{A}_1 + \hat{A}_2 \\ \tilde{A} \end{pmatrix}, S = \begin{pmatrix} \hat{S} \\ \tilde{S}_1 + \tilde{S}_2 \end{pmatrix}, \quad \text{EQUATION 5}$$

$$\vec{d} = \begin{pmatrix} \hat{D} \\ \tilde{D}_1 + \tilde{D}_2 \end{pmatrix} = \iota_2(\vec{y}) + S\vec{u}_2$$

which shows how commitment $\vec{d}$ is generated from $\vec{y}$ and S for the proof. Further, for $i \in \{1,2\}$:

$$\Gamma_i := \begin{pmatrix} \hat{\Gamma}_i & \check{\Gamma} \\ \check{\Gamma} & 0 \end{pmatrix}, \Gamma := \begin{pmatrix} \hat{\Gamma}_1 + \hat{\Gamma}_2 & \check{\Gamma} \\ \check{\Gamma} & 0 \end{pmatrix} \quad \text{EQUATION 6}$$

where $\hat{\Gamma}_i$ consists of $\Gamma$[j, k] with $j \in M$ and $k \in N$, $\check{\Gamma}$ consists of $\Gamma$[j, k] with $j \in M$ and $k \in \overline{N}$, $\check{\Gamma}$ consists of $\Gamma$[j, k] with $j \in \overline{M}$ and $k \in N$, and a zero matrix of $\Gamma$[j, k] with $j \in \overline{M}$ and $k \in \overline{N}$. Substituting EQUATIONS 2 and 3 with EQUATIONS 4 and 6, respectively, then, $\pi = \pi_1 + \pi_2$:

$$\vec{\pi} = \left( (\hat{R}^T \quad \tilde{R}_1^T) \begin{pmatrix} \iota_2(\hat{B}_1) \\ \iota_2(\tilde{B}) \end{pmatrix} + (\hat{R}^T \quad \tilde{R}_2^T) \begin{pmatrix} \iota_2(\hat{B}_2) \\ \iota_2(\tilde{B}) \end{pmatrix} \right) +$$

$$\left( (\hat{R}^T \quad \tilde{R}_1^T) \begin{pmatrix} \hat{\Gamma}_1 & \check{\Gamma} \\ \check{\Gamma} & 0 \end{pmatrix} \begin{pmatrix} \iota_2(\hat{Y}) \\ \iota_2(\tilde{Y}_1) \end{pmatrix} + (\hat{R}^T \quad \tilde{R}_2^T) \begin{pmatrix} \hat{\Gamma}_2 & \check{\Gamma} \\ \check{\Gamma} & 0 \end{pmatrix} \begin{pmatrix} \iota_2(\hat{Y}) \\ \iota_2(\tilde{Y}_2) \end{pmatrix} \right) +$$

$$\left( (\hat{R}^T \quad \tilde{R}_1^T) \begin{pmatrix} \hat{\Gamma}_1 & \check{\Gamma} \\ \check{\Gamma} & 0 \end{pmatrix} \begin{pmatrix} \hat{S} \\ \tilde{S}_1 \end{pmatrix} + (\hat{R}^T \quad \tilde{R}_2^T) \begin{pmatrix} \hat{\Gamma}_2 & \check{\Gamma} \\ \check{\Gamma} & 0 \end{pmatrix} \begin{pmatrix} \hat{S} \\ \tilde{S}_2 \end{pmatrix} \right) \vec{u}_2 -$$

$$(T_1^T + T_2^T)\vec{u}_2 + \left( \sum_{j=1}^{\eta} r_j^{(1)} H_j + \sum_{j=1}^{\eta} r_j^{(2)} H_j \right) \vec{u}_2$$

Multiplying matrices and regrouping with EQUATIONS 4 and 6 yields:

$$\vec{\pi} = \left( (\hat{R}^T \quad (\tilde{R}_1 + \tilde{R}_2)^T \right) \begin{pmatrix} \iota_2(\hat{B}_1 + \hat{B}_2) \\ \iota_2(\tilde{B}) \end{pmatrix} +$$

$$(\hat{R}^T(\hat{\Gamma}_1 + \hat{\Gamma}_2) + (\tilde{R}_1 + \tilde{R}_2)^T \check{\Gamma} \quad \hat{R}^T \check{\Gamma}) \begin{pmatrix} \iota_2(\hat{Y}) \\ \iota_2(\tilde{Y}_1 + \tilde{Y}_2) \end{pmatrix} +$$

$$(\hat{R}^T(\hat{\Gamma}_1 + \hat{\Gamma}_2) + (\tilde{R}_1 + \tilde{R}_2)^T \check{\Gamma} \quad \hat{R}^T \check{\Gamma}) \begin{pmatrix} \hat{S} \\ \tilde{S}_1 + \tilde{S}_2 \end{pmatrix} \vec{u}_2 + \sum_{j=1}^{\eta} r_j H_j \vec{u}_2$$

Replacing $\vec{b}$ and R from EQUATION 4 and $\vec{y}$ and S from EQUATION 5, then $\vec{\pi} = R^T \iota_2(\vec{b}) + R^T \Gamma \iota_2(\vec{y}) + R^T \Gamma S \vec{u}_2 - T^T \vec{u}_2 + \Sigma_{j=1}^{\eta} r_j H_j \vec{u}_2$. Similarly, $\vec{\psi} := S^T \iota_1(\vec{\alpha}) + S^T \Gamma^T \iota_1(\vec{x}) + T \vec{u}_1$. As such, $\vec{c}$, $\vec{d}$, $\vec{\pi}$, and $\vec{\psi}$ are generated according to the formula for a GS proof of $(\vec{\alpha}, \vec{b}, \Gamma, t)$ and $(\vec{x}, \vec{y})$. Therefore, Proof is a valid proof of Sta and Wit. Accordingly, theorem 3.1 holds.

Proof sketch of theorem 5.1. The correctness and composable ZK of theorem 5.1 comes from the GS proof, the GS proof's instantiations, and the fact that $y_2 \notin$ AcSet and $X_{j2} \neq 0$ means $T_j \neq 0$. Further, a setup and a proof may be simulated that are respectively computationally indistinguishable from a real setup and a real proof generated from the simulated setup.

Soudness may be proven as follows. Suppose an adversary could forge a proof that VerifyNM accepts for equations $\wedge_{j=1}^{m} ((y_1+y_2)X_{j1}+y_{j3}P_1=V_j \wedge X_{j3}-y_{j3}A=0 \wedge y_{j3}X_{j2}=T_j)$ where $T_j \neq 0$ but $y_2$ is accumulated in one of $V_j$s with non-negligible probability. The proof may be used to break ESDH.

Given the assumption challenge (p, $\mathbb{G}_1, \mathbb{G}_2, \mathbb{G}_T$, e, $P_1$, $\delta P_1, \ldots, \delta^{q+1} P_1$, A, $P_2$, $\delta P_2$), simulate random CRS σ with extracting trapdoor for GS proofs in either the SXDH or SDLIN instantiations. Accordingly, from a commitment in $\mathbb{G}_2$ of $y \in Z_p$ and a commitment of $X \in \mathbb{G}_1$, $yP_2$ and X may be respectively extracted. With the trapdoor, compute $\tau := l_{2,}(\delta)$, thereby providing all parameters for a simulated accumulator.

The forged proof contains commitments of $X_{j1}, X_{j3}, X_{j2}$ and of $y_1=\delta, y_2, y_{j3}$ in $\mathbb{G}_2$. As such, $X_{j1}, X_{j3}, X_{j2}$ and $y_2 P_2, y_{j3} P_2$ could be extracted, and know $y_{j3} \neq 0$. As $y_2$ is in AcSet, then $y_2$ could be found. Suppose $y_2$ is accumulated in $V_l$ which accumulates $\{\alpha_1, \ldots, \alpha_k\}$. As $X_{l3}=y_{l3}A$, $X_{l1}$, $y_2$ and $(y_{l3}P_2, y_{l3}A)$ could be extracted. Therefore, $(y_1+y_2)X_{l1}+y_{l3}P_1=\Pi_{i=1}^{k}(y_1+\alpha_i)y_1P_1$ and $y_2 \in \{\alpha_1, \ldots, \alpha_k\}$. Accordingly, $$\frac{y_{l3}}{y_1 + y_2} P_1$$

may be computed from $X_{j1}, \{\alpha_1, \ldots, \alpha_k\}$ and $\zeta$. As such, $$\left(\frac{y_{j3}}{\delta+y_2}P_1, y_2, y_{j3}P_2, y_{j3}A\right)$$

could be found to break the assumption.

Proof sketch of theorem 5.2. To prove delegatability, consider CompProofs output is a randomized proof of equations $\wedge_{j=1}^{m} ((y_1+y_2)X_{j1}+y_{j3}P_1=V_j \wedge X_{j3}-y_{j3}A=0 \wedge y_{j3}X_{j2}=T_j)$ which are the same as equations for the proof outputted by ProveNM. Due to GS proofs' randomizability, the outputs have the same distribution, indicating Delegatability.

For proving redelegatability, consider the same $y_2$. The output $T'^{(i)}, i \in \{1, \ldots, k+1\}$ of Rede has the same distribution as the output $T^{(i)}, i \in \{1, \ldots, k+1\}$ of Dele. For the same $T^{(i)}$, $i \in \{1, \ldots, k+1\}$, Rede's output is a randomization of a proof that Dele could produce, so their outputs have the same distribution. Therefore, Dele and Rede output the same distribution that leads to redelegatability. Verifiability comes from ESDH and the completeness and soundness of GS proofs, as De is a GS proof.

If an adversary can break the accumulator's unlinkability, it may be proven that either q-DSDH or GS's underlying assumption (SXDH or SDLIN) can be broken. Consider 2 cases. If the adversary can distinguish between a GS proof De and its simulated proof both in a simulated setup with non-negligible probability, then the underlying assumption may be broken. If not, then q-DSDH can be broken as follows.

Suppose the q-DSDH Challenge p, $\mathbb{G}_1, \mathbb{G}_2, \mathbb{G}_T$, e, $P_1, P_2, B_0, x_0 B_0, \ldots, x_0^q B_0, B_1, x_b B_1, \ldots, x_b^q B_1$ is given. Simulate a CRS for GS proofs from the setup. Use the same simulation for GS proofs, and simulate a proof De for $\wedge_{i=1}^{q+1} ((\delta+y_2)X_1^{(i)}+y_3^{(i)}P_1=\delta^i P_1 \wedge X_3^{(i)}-y_3^{(i)}A=0 \wedge y_3^{(i)}X_2=(-1)^i x_0^{i-1} B_0)$, and a proof $De_b$ for $\wedge_{i=1}^{q+1} ((\delta+y_2)X_1^{(i)}+y_3^{(i)}P_1=\delta^i P_1 \wedge X_3^{(i)}-y_3^{(i)}A=0 \wedge y_3^{(i)}X_2=(-1)^i x_b^{i-1} B_1)$. The adversary may then be given De and $De_b$. As the adversary can not distinguish between a delegating key and a simulated one with non-negligible probability, the adversary may break unlinkability. Accordingly, the adversary could tell with non-negligible advantage over a random guess if b is 0 or 1. That breaks q-DSDH.

Proof sketch of theorem 6.1. The scheme's correctness comes from correctness of its component authentication scheme and the concatenation of CredPS, NMPS and EQPS, and delegatability and redelegatability of the accumulator 102. The unforgeability proof is based on F-unforgeability and certification-security of the authentication scheme, and partial extractability and soundness of the concatenation.

The anonymity proof is also similar to the one for randomizable proofs and delegatable anonymous credentials. One difference is to create SimIssue indistinguishable from Issue with input DeInf. SimSetup includes AtSetup and the simulation setup SimConSetup for the concatenation. It is true that the accumulator's four delegation properties still hold under parameters generated by SimConSetup. Otherwise, an adversary breaking one of the properties could distinguish SimConSetup and the concatenation setup ConSetup. It is also true that a concatenation of just CredPS and EQPS is also composable ZK using simulation SimConSetup. SimIssue first generates a list of delegating keys for L random r-nyms. Based on the accumulator's unlinkability and redelegatability, the adversary can not distinguish this list from the list in $DeInf_U$ generated by Issue, as r-nyms of input DeInf to Issue are also randomly generated and not revealed to the adversary. SimIssue then simulates the concatenation of CredPS and EQPS with r-nyms commitments in the delegating keys and merge it with the delegating keys to output. This output is indistinguishable from the output $(Cred_U, DeInf_U)$ generated by Issue.

Figure 3:
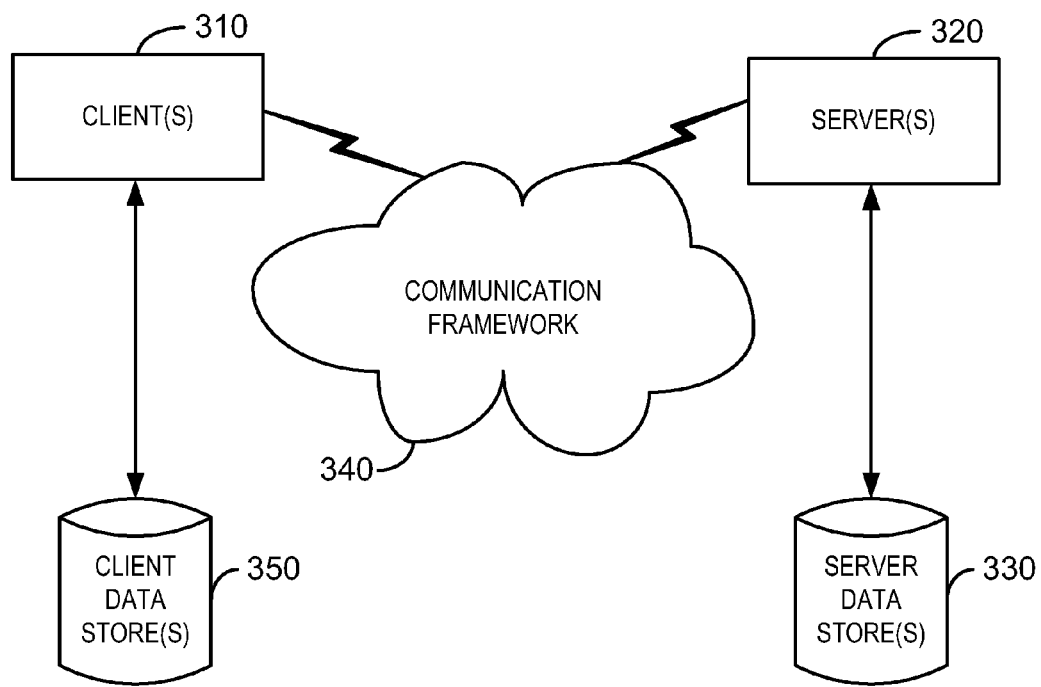
FIG. 3 is a block diagram of an exemplary networking environment wherein aspects of the claimed subject matter can be employed.

FIG. 3 is a block diagram of an exemplary networking environment 300 wherein aspects of the claimed subject matter can be employed. Moreover, the exemplary networking environment 300 may be used to implement a system and method of revoking delegatable anonymous credentials.

The networking environment 300 includes one or more client(s) 310. The client(s) 310 can be hardware and/or software (e.g., threads, processes, computing devices). As an example, the client(s) 310 may be computers providing access, for users of a web browser, to servers over a communication framework 340, such as the Internet.

The system 300 also includes one or more server(s) 320. The server(s) 320 can be hardware and/or software (e.g., threads, processes, computing devices). The server(s) 320 may include web servers, or other servers that support delegatable anonymous credentials.

The server(s) may be accessed by the client(s) 310. The servers 320 can house threads to delegate and revoke anonymous credentials.

One possible communication between a client 310 and a server 320 can be in the form of a data packet adapted to be transmitted between two or more computer processes. The system 300 includes a communication framework 340 that can be employed to facilitate communications between the client(s) 310 and the server(s) 320.

The client(s) 310 are operably connected to one or more client data store(s) 350 that can be employed to store information local to the client(s) 310. The client data store(s) 350 may be located in the client(s) 310, or remotely, such as in a cloud server. Similarly, the server(s) 320 are operably connected to one or more server data store(s) 330 that can be employed to store information local to the servers 320.

Figure 4:
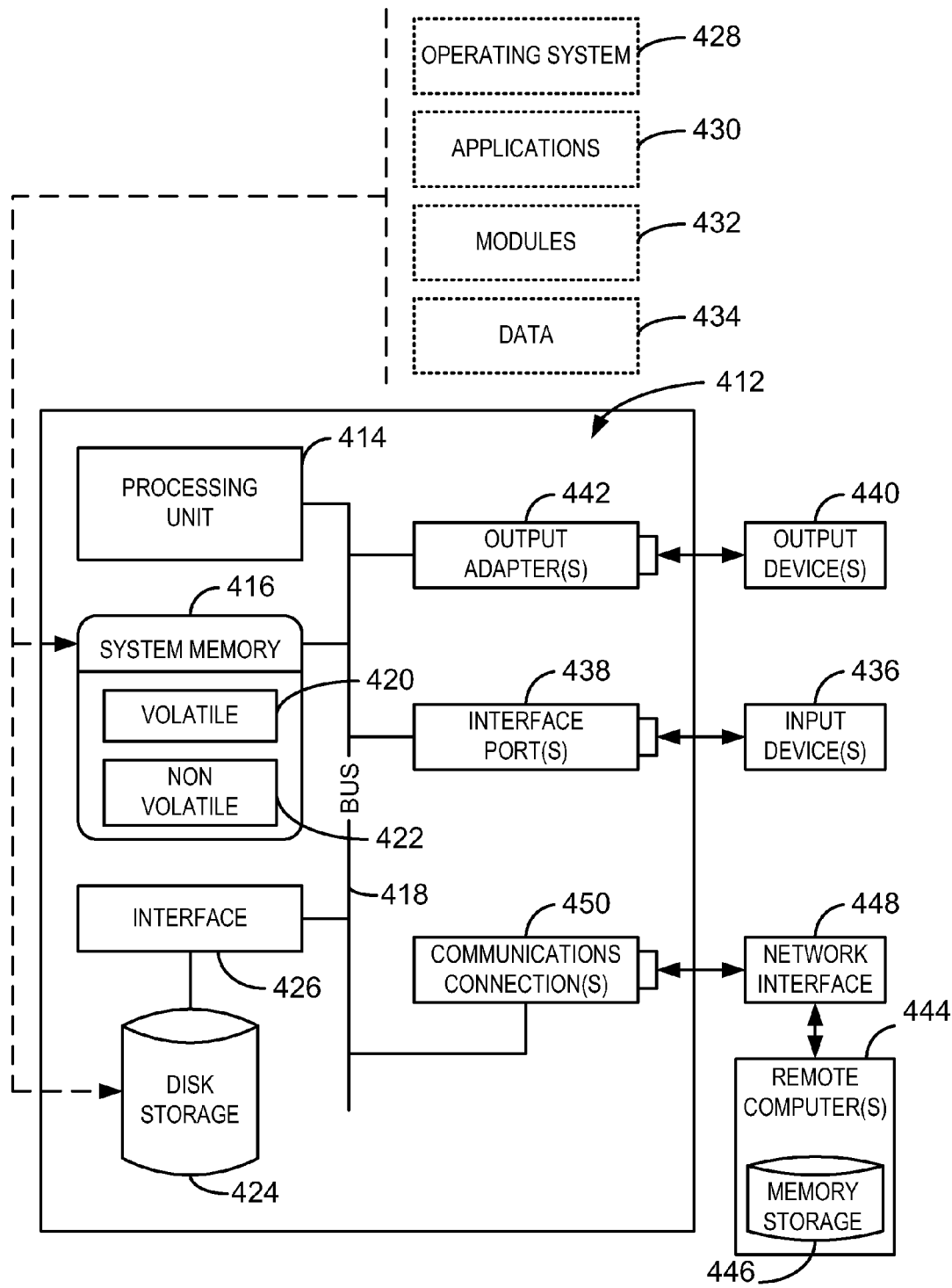
FIG. 4 is a block diagram of an exemplary operating environment for implementing various aspects of the claimed subject matter.

With reference to FIG. 4, an exemplary operating environment 400 for implementing various aspects of the claimed subject matter. The exemplary operating environment 400 includes a computer 412. The computer 412 includes a processing unit 414, a system memory 416, and a system bus 418.

The system bus 418 couples system components including, but not limited to, the system memory 416 to the processing unit 414. The processing unit 414 can be any of various available processors. Dual microprocessors and other multi-processor architectures also can be employed as the processing unit 414.

The system bus 418 can be any of several types of bus structure(s) including the memory bus or memory controller, a peripheral bus or external bus, and/or a local bus using any variety of available bus architectures known to those of ordinary skill in the art. The system memory 416 is non-transitory computer-readable media that includes volatile memory 420 and nonvolatile memory 422.

The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 412 also includes other non-transitory computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that the claimed subject matter can be implemented with various operating systems or combinations of operating systems.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440.

Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting a universal, dynamic accumulator in a networked environment using logical connections to one or more remote computers, such as remote computer(s) 444. The remote computer(s) 444 may be client systems configured with web browsers, PC applications, mobile phone applications, and the like, to allow users to delegate and revoke anonymous credentials, as discussed herein. For example, remote computer 444 may include a client used to request delegation and revocation of anonymous credentials.

The remote computer(s) 444 can be a personal computer, a server, a router, a network PC, a workstation, a microprocessor based appliance, a mobile phone, a peer device or other common network node and the like, and typically includes many or all of the elements described relative to the computer 412.

For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary embodiment of the computer 412 may comprise a server hosting a website. Anonymous credentials may be used to control access to the website. The server may be configured to delegate and revoke the anonymous credentials.

An exemplary processing unit 414 for the server may be a computing cluster comprising Intel® Xeon CPUs. The disk storage 424 may comprise an enterprise data storage system, for example, holding thousands of impressions.

Exemplary embodiments of the subject innovation may display an icon on the remote computer(s) 444 that is clickable to request asynchronous searches. Asynchronous search results may be requested from human or crowd-sourcing resources. Results may be made available via a non-intrusive icon on the remote computer(s) 444.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for revoking delegatable anonymous credentials, comprising:
   receiving, in a processor, a request to revoke an anonymous credential representative of an ability to prove non-membership in an accumulator for a first entity, wherein the anonymous credential is delegated from the first entity to a second entity;
   revoking the anonymous credential from the first entity in response to the request to revoke the anonymous credential; and
   revoking the anonymous credential from the second entity in response to the request to revoke the anonymous credential,
   wherein revoking the anonymous credential from the second entity comprises revoking a delegated descendant of the anonymous credential.

2. The method recited in claim 1, wherein the accumulator comprises a universal and dynamic accumulator.

3. The method recited in claim 1, comprising:
   delegating the anonymous credential to a third entity; and
   revoking the anonymous credential from the third entity in response to the request to revoke the anonymous credential, wherein the anonymous credential is delegated from the second entity to the third entity.

4. The method recited in claim 1, wherein the accumulator comprises:
   an accumulator value comprising an identity of the anonymous credential; and
   a non-membership proof system for the accumulator value.

5. The method recited in claim 4, wherein the non-membership proof system is configured to prove non-membership of the anonymous credential.

6. The method recited in claim 4, wherein the non-membership proof system comprises homomorphic proofs.

7. The method recited in claim 6, wherein the homomorphic proofs comprise Groth-Sahai proofs.

8. The method recited in claim 1, wherein the request is received from an anonymous credential system.

9. A system for revoking delegatable anonymous credentials, comprising:
   a processing unit; and
   a system memory, wherein the system memory comprises code configured to direct the processing unit to:
   receive a request to revoke an anonymous credential representative of an ability to prove non-membership in a universal, dynamic accumulator for a first entity, wherein the anonymous credential is delegated from the first entity to a second entity;
   revoke the anonymous credential from the first entity in response to the request to revoke the anonymous credential; and
   revoke the anonymous credential from the second entity in response to the request to revoke the anonymous credential,
   wherein revoking the anonymous credential from the second entity comprises revoking a delegated descendant of the anonymous credential.

10. The system recited in claim 9, wherein the code is configured to direct the processing unit to:
    delegate the anonymous credential to a third entity; and
    revoke the anonymous credential from the third entity in response to the request to revoke the anonymous credential, wherein the second entity delegates the anonymous credential to the third entity.

11. The system recited in claim 9, wherein the accumulator comprises:
    an accumulator value comprising an identity of the anonymous credential; and
    a non-membership proof system for the accumulator value.

12. The system recited in claim 11, wherein the non-membership proof system is configured to prove non-membership of the anonymous credential before the anonymous credential is revoked.

13. The system recited in claim 11, wherein the non-membership proof system comprises homomorphic proofs.

14. The system recited in claim 13, wherein the homomorphic proofs comprise Groth-Sahai proofs.

15. The system recited in claim 9, wherein the request is received from an anonymous credential system.

16. One or more computer-readable storage devices, comprising code configured to direct a processing unit to:
    receive a request to revoke an anonymous credential representative of an ability to prove non-membership in a universal, dynamic accumulator for a first entity, wherein the request is received from an anonymous credential system, and wherein the anonymous credential is delegated from the first entity to a second entity;

revoke the anonymous credential from the first entity in response to the request to revoke the anonymous credential; and revoke the anonymous credential from a second entity in response to the request to revoke the anonymous credential, wherein the first entity delegates the anonymous credential to the second entity, wherein revoking the anonymous credential from the second entity comprises revoking a delegated descendant of the anonymous credential.

17. The computer-readable storage devices recited in claim 16, wherein the code is configured to direct the processing unit to:

delegate the anonymous credential to a third entity; and revoke the anonymous credential from the third entity in response to the request to revoke the anonymous credential, wherein the second entity delegates the anonymous credential to the third entity.

18. The computer-readable storage devices recited in claim 16, wherein the accumulator comprises:

an accumulator value comprising an identity of the anonymous credential; and a non-membership proof system for the accumulator value.

19. The computer-readable storage devices recited in claim 18, wherein the non-membership proof system is configured to prove non-membership of the anonymous credential before the anonymous credential is revoked.

20. The computer-readable storage devices recited in claim 18, wherein the non-membership proof system comprises homomorphic Groth-Sahai proofs.

* * * * *